US012125285B1

(12) United States Patent
Vaziri

(10) Patent No.: US 12,125,285 B1
(45) Date of Patent: *Oct. 22, 2024

(54) METHOD AND APPARATUS FOR A WEARABLE COMPUTER

(71) Applicant: Optics Innovation LLC, Portland, ME (US)

(72) Inventor: Masoud Vaziri, Richardson, TX (US)

(73) Assignee: Optics Innovation LLC, Portland, ME (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/887,439

(22) Filed: Aug. 13, 2022

Related U.S. Application Data

(63) Continuation of application No. 16/578,285, filed on Sep. 21, 2019, now Pat. No. 11,450,113.

(51) Int. Cl.
*G06V 20/00* (2022.01)
*G02B 13/16* (2006.01)
(Continued)

(52) U.S. Cl.
CPC .............. *G06V 20/52* (2022.01); *G02B 13/16* (2013.01); *G02B 26/0875* (2013.01);
(Continued)

(58) Field of Classification Search
CPC ........... G06K 9/00771; G06K 9/00604; G06K 9/00845; G02B 13/16; G02B 26/0875;
(Continued)

(56) References Cited

U.S. PATENT DOCUMENTS 4,028,725 A 6/1977 Lewis
4,907,296 A 3/1990 Blecha
(Continued)

OTHER PUBLICATIONS

Cheng et al. Developing a Real-Time Identify-and-Locate System for the Blind. Workshop on Computer Vision Applications for the Visually Impaired, James Coughlan and Roberto Manduchi, Oct. 2008, Marseille, France.*

(Continued)

*Primary Examiner* — Frank F Huang
(74) *Attorney, Agent, or Firm* — Nixon Peabody LLP

(57) ABSTRACT

An embodiment of a Wearable Computer apparatus includes a first portable unit for data gathering and providing a natural user interface, and a second portable unit for processing the gathered data from the first unit and taking an action in respond to the received data. The first portable unit includes an eyeglass frame, at least one first scene camera disposed on the eyeglass frame for capturing at least one scene image corresponding to a field of view of a user, at least one microphone, one speaker and one LED to create a natural user interface, and at least one first processor to receive data from the data gathering units in the first portable unit and communicating that data to the second portable unit. The second portable unit is in communication with the first portable unit and includes at least one second processor configured for receiving data from the first processor. The second portable unit also includes at least one interface of a digital personal assistant that receives at least one scene image from the first portable unit and initiates an object recognition procedure to recognize an object in the at least one scene image. Based on the at least one recognized object, the digital personal assistant takes an action that may include providing a feedback to the user via light or audio.

28 Claims, 29 Drawing Sheets

(51) Int. Cl.

| | |
|---|---|
| G02B 26/08 | (2006.01) |
| G02B 27/00 | (2006.01) |
| G02B 27/01 | (2006.01) |
| G02B 27/64 | (2006.01) |
| G06F 1/16 | (2006.01) |
| G06F 3/01 | (2006.01) |
| G06F 3/0484 | (2022.01) |
| G06F 3/04842 | (2022.01) |
| G06F 3/16 | (2006.01) |
| G06V 20/52 | (2022.01) |
| G06V 20/59 | (2022.01) |
| G06V 40/19 | (2022.01) |
| H04N 7/18 | (2006.01) |
| H04N 23/11 | (2023.01) |
| H04N 23/56 | (2023.01) |
| H04N 23/58 | (2023.01) |
| H04R 1/02 | (2006.01) |
| H04W 4/02 | (2018.01) |

(52) U.S. Cl.
CPC ....... *G02B 27/0093* (2013.01); *G02B 27/017* (2013.01); *G02B 27/0172* (2013.01); *G02B 27/64* (2013.01); *G06F 1/163* (2013.01); *G06F 3/012* (2013.01); *G06F 3/013* (2013.01); *G06F 3/015* (2013.01); *G06F 3/017* (2013.01); *G06F 3/0484* (2013.01); *G06F 3/04842* (2013.01); *G06F 3/167* (2013.01); *G06V 20/597* (2022.01); *G06V 40/19* (2022.01); *H04N 7/185* (2013.01); *H04N 23/11* (2023.01); *H04N 23/56* (2023.01); *H04N 23/58* (2023.01); *H04R 1/028* (2013.01); *H04W 4/023* (2013.01); *G02B 2027/0132* (2013.01); *G02B 2027/0138* (2013.01); *G02B 2027/014* (2013.01); *G02B 2027/0178* (2013.01); *G02B 2027/0187* (2013.01); *G06F 2203/04806* (2013.01); *H04R 2201/107* (2013.01); *H04R 2460/13* (2013.01)

(58) Field of Classification Search
CPC .............. G02B 27/0093; G02B 27/017; G02B 27/0172; G02B 27/64; G02B 2027/0132; G02B 2027/0138; G02B 2027/014; G02B 2027/0178; G02B 2027/0187; G06F 1/163; G06F 3/012; G06F 3/013; G06F 3/015; G06F 3/017; G06F 3/0484; G06F 3/04842; G06F 3/167; G06F 2203/04806; H04N 5/2256; H04N 5/2259; H04N 5/332; H04N 7/185; H04R 1/028; H04R 2201/107; H04R 2460/13; H04W 4/023

See application file for complete search history.

(56) References Cited

U.S. PATENT DOCUMENTS

| | | | | |
|---|---|---|---|---|
| 5,262,871 A * | 11/1993 | Wilder | ............ | H01L 27/14643 348/307 |
| 5,856,811 A | 1/1999 | Shih et al. | | |
| 5,859,921 A * | 1/1999 | Suzuki | .................. | G08B 21/06 382/118 |
| 6,163,336 A | 12/2000 | Richards | | |
| 6,198,485 B1 * | 3/2001 | Mack | ..................... | G06F 3/014 345/419 |
| 6,307,526 B1 | 10/2001 | Mann | | |
| 6,434,280 B1 | 8/2002 | Peleg | | |
| 6,486,799 B1 * | 11/2002 | Still | ..................... | G01C 23/005 340/961 |
| 6,661,495 B1 | 12/2003 | Popovich | | |
| 6,766,067 B2 | 7/2004 | Freeman | | |
| 6,850,629 B2 | 2/2005 | Jeon | | |
| 7,023,464 B1 | 4/2006 | Harada et al. | | |
| 7,331,671 B2 | 2/2008 | Hammond | | |
| 7,391,887 B2 | 6/2008 | Durnell | | |
| 7,492,926 B2 * | 2/2009 | Kang | ................ | G06K 9/00604 382/117 |
| 7,697,024 B2 | 4/2010 | Currivan et al. | | |
| 7,894,666 B2 * | 2/2011 | Mitarai | ................ | G06T 7/0012 382/167 |
| 8,014,632 B2 | 9/2011 | Matsumoto | | |
| 8,139,089 B2 | 3/2012 | Doyle et al. | | |
| 8,159,519 B2 | 4/2012 | Kurtz et al. | | |
| 8,305,899 B2 | 11/2012 | Luo et al. | | |
| 8,432,492 B2 * | 4/2013 | Deigmoeller | ...... | H04N 21/4126 348/581 |
| 8,872,910 B1 | 10/2014 | Vaziri | | |
| 9,438,491 B1 | 9/2016 | Van Broeck | | |
| 9,438,819 B2 * | 9/2016 | Van Broeck | ............ | G06F 3/013 |
| 9,618,746 B2 | 4/2017 | Browne | | |
| 9,674,490 B2 | 6/2017 | Koravadi | | |
| 9,727,790 B1 | 8/2017 | Vaziri | | |
| 9,779,311 B2 | 10/2017 | Lee et al. | | |
| 9,858,676 B2 | 1/2018 | Bostick et al. | | |
| 9,864,372 B2 | 1/2018 | Chen et al. | | |
| 10,039,445 B1 | 8/2018 | Torch | | |
| 10,064,552 B1 | 9/2018 | Vaziri | | |
| 10,708,514 B2 | 7/2020 | Haltmaier | | |
| 11,189,017 B1 | 11/2021 | Bagai | | |
| 11,287,262 B2 | 3/2022 | Dooley | | |
| 2003/0122930 A1 | 7/2003 | Schofield | | |
| 2004/0212882 A1 | 10/2004 | Liang | | |
| 2004/0218834 A1 | 11/2004 | Bishop | | |
| 2006/0033992 A1 | 2/2006 | Solomon | | |
| 2007/0041663 A1 | 2/2007 | Cho | | |
| 2007/0115349 A1 * | 5/2007 | Currivan | ................ | H04N 7/141 348/14.08 |
| 2008/0010060 A1 | 1/2008 | Asano | | |
| 2008/0030592 A1 | 2/2008 | Border | | |
| 2008/0036875 A1 | 2/2008 | Jones et al. | | |
| 2008/0198324 A1 | 8/2008 | Fuziak | | |
| 2008/0291295 A1 | 11/2008 | Kato | | |
| 2008/0297589 A1 | 12/2008 | Kurtz | | |
| 2009/0189974 A1 | 7/2009 | Deering | | |
| 2010/0053555 A1 * | 3/2010 | Enriquez | ............ | G02B 27/017 351/210 |
| 2010/0128135 A1 * | 5/2010 | Filipovich | .......... | G02B 27/0172 348/217.1 |
| 2010/0157078 A1 | 6/2010 | Atanassov | | |
| 2010/0208207 A1 | 8/2010 | Connell, II | | |
| 2010/0240988 A1 | 9/2010 | Varga et al. | | |
| 2010/0254630 A1 | 10/2010 | Ali et al. | | |
| 2010/0277619 A1 | 11/2010 | Scarff | | |
| 2010/0289941 A1 | 11/2010 | Ito et al. | | |
| 2010/0290668 A1 | 11/2010 | Friedman | | |
| 2010/0290685 A1 | 11/2010 | Wein | | |
| 2011/0263946 A1 | 10/2011 | El Kaliouby | | |
| 2011/0279666 A1 * | 11/2011 | Strombom | ......... | G06K 9/00604 348/78 |
| 2012/0257005 A1 | 10/2012 | Browne | | |
| 2013/0242057 A1 | 9/2013 | Hong | | |
| 2014/0146153 A1 | 5/2014 | Birnkrant et al. | | |
| 2014/0267890 A1 | 9/2014 | Lelescu | | |
| 2014/0313335 A1 | 10/2014 | Koravadi | | |
| 2015/0009550 A1 | 1/2015 | Misago et al. | | |
| 2015/0209002 A1 | 7/2015 | De Beni | | |
| 2016/0012280 A1 | 1/2016 | Ito | | |
| 2016/0179093 A1 | 6/2016 | Prokorov | | |
| 2016/0225192 A1 | 8/2016 | Jones et al. | | |
| 2017/0007351 A1 | 1/2017 | Yu | | |
| 2017/0019599 A1 | 1/2017 | Muramatsu | | |
| 2017/0099479 A1 | 4/2017 | Browd et al. | | |
| 2017/0142312 A1 | 5/2017 | Dal Mutto | | |
| 2017/0181802 A1 | 6/2017 | Sachs et al. | | |
| 2017/0225336 A1 | 8/2017 | Deyle | | |
| 2017/0322410 A1 | 11/2017 | Watson et al. | | |
| 2017/0360578 A1 | 12/2017 | Shin | | |
| 2018/0012413 A1 | 1/2018 | Jones et al. | | |
| 2018/0330473 A1 | 11/2018 | Foi | | |
| 2019/0175214 A1 | 6/2019 | Wood | | |

(56) References Cited

U.S. PATENT DOCUMENTS

| | | | |
|---|---|---|---|
| 2019/0254754 A1 | 8/2019 | Johnson et al. |
| 2020/0041261 A1 | 2/2020 | Bernstein |
| 2020/0077033 A1 | 3/2020 | Chan |
| 2020/0117025 A1 | 4/2020 | Sauer |
| 2020/0330179 A1 | 10/2020 | Ton |
| 2021/0067764 A1 | 3/2021 | Shau et al. |

OTHER PUBLICATIONS

John Bardsley et al.; Blind Iterative Restoration of Images With Spatially-Varying Blur; 9 pages.

Sang-Hyuck Lee et al.; Breaking Diffraction Limit of a Small F-Number Compact Camera Using Wavefront Coding; Center for Information Storage Device; Department of Mechanical Engineering, Yonsei University, Shinchondong, Sudaemungu, Seoul 120-749, Korea; Sep. 1, 2008; vol. 16, No. 18; pp. 13569-13578.

Tod R. Lauer; Deconvolution With a Spatially-Variant PSF; National Optical Astronomy Observatory; Tucson, AZ; arXiv:astro-ph/0208247v1; Aug. 12, 2002; 7 pages.

Suk Hwan Lim and Amnon Silverstein; Estimation and Removal of Motion Blur by Capturing Two Images With Different Exposures; HP Laboratories and NVidia Corp.; HPL-2008-170; Oct. 21, 2008; 8 pages.

William T. Freeman et al.; Example-Based Super-Resolution; Mitsubishi Electric Research Labs; Mar./Apr. 2002; IEEE Computer Graphics and Applications; pp. 56-65.

Edward R. Dowski, Jr. et al.; Extended Depth of Field Through Wave-Front Coding; Apr. 10, 1995; Optical Society of America; vol. 34, No. 11; Applied Optics pp. 1859-1866.

Maria E. Angelopoulou et al.; FPGA-based Real-time Super-Resolution on an Adaptive Image Sensor; Department of Electrical and Electronic Engineering, Imperial College London; 9 pages.

Patrick Vandewalle et al.; A Frequency Domain Approach to Registration of Aliased Images with Application to Super-resolution; Ecole Polytechnique Federal de Lausanne, School of Computer and Communication Sciences; Department of Electrical Engineering and Computer Sciences, University of California; EURASIP Journal on Applied Signal Processing; vol. 2006, Article ID 71459, pp. 1-14.

Barbara Zitova et al.; Image Registration Methods: a Survey; Department of Image Processing; Institute of Information Theory and Automation Academy of Sciences of the Szech Republic; Image and Vision Computing; pp. 977-1000.

Danny Keren et al.; Image Sequence Enhancement Using Sub-pixel Displacements; Department of computer science; The Hebrew University of Jerusalem; 1988 IEEE; pp. 742-746.

Athanasios Papoulis; A New Algorithm in Spectral Analysis and Band-Limited Extrapolation; IEEE Transactions on Circuits and Systems, Sep. 1975; vol. CAS-22, No. 9; pp. 735-742.

W. Thomas Cathey et al.; New Paradigm for Imaging Systems; Optical Society of America; Applied Optics; Oct. 10, 2002; vol. 41, No. 29; pp. 6080-6092.

Oliver Bowen et al.; Real-Time Image Super Resolution Using an FPGA; Department of Electrical and Electronic Engineering; Imperial College London; 2008 IEEE; pp. 89-94.

Kennet Kubala et al.; Reducing Complexity in Computational Imaging Systems; CDM Optics, Inc.; Sep. 8, 2003; vol. 11, No. 18; Optics Express; pp. 2102-2108.

Maria E. Angelopoulou et al.; Robust Real-Time Super-Resolution on FPGA and an Application to Video Enhancement; Imperial College London; ACM Journal Name; Sep. 2008; vol. V, No. N; pp. 1-27.

Eran Gur and Zeev Zalevsky; Single-Image Digital Super-Resolution a Revised Gerchberg-Papoulis Algorithm; IAENG International Journal of Computer Science; Nov. 17, 2007; pp. 1-5.

Lisa Gottesfeld Brown; A Survey of Image Registration Techniques; Department of Computer Science; Columbia University; Jan. 12, 1992; pp. 1-60.

Pravin Bhat et al.; Using Photographs to Enhance Videos of a Static Scene; University of Washington; Microsoft Research; Adobe Systems; University of California; The Eurographics Association 2007; pp. 1-12.

Guestrin et al. "General Theory of Remote Gaze Estimation Using the Pupil Center and Corneal Reflections", IEEE Trans. Biomedical Eng., vol. 53, No. 6, pp. 1124-1133, Jun. 2006.

Malcolm et al. Combining topdown processes to guide eye movements during real-world scene search. Journal of Vision, 10(2):4, p. 1-11 (2010).

Todd Holmdahl, Build 2015: A closer look at the Microsoft HoloLens hardware, https://blogs.windows.com/devices/2015/04/30/build-2015-a-closer-look-at-the-microsoft-hololens-hardware/.

Lindsay James, Introducing Microsoft HoloLens Development Edition, https://blogs.windows.com/devices/2015/04/30/build-2015-a-closer-look-at-the-microsoft-hololens-hardware/.

Jordan Novet, Microsoft could build a life-sized Cortana for HoloLens, https://www.technologyrecord.com/Article/introducing-microsoft-hololens-development-edition-48296.

Fritz Gleyo, Microsoft May Make Life-Sized Cortana in Person for HoloLens, (Dec. 14, 2015).

Jessi Hempel, Project HoloLens: Our Exclusive Hands-On With Microsoft's Holographic Goggles, (Jan. 21, 2015).

Extrema.m, http://www.mathworks.com/matlabcentral/fileexchange/12275-extrema-m-extrema2-m, Sep. 14, 2006.

Eyelink User Manual, SR Research Lid., Copyright 2005-2008, 134 pages.

Eyelink Data Viewer User's Manual, SR Research Lid., Copyright 2002-2008, 149 pages.

Lees et al. (Ultrasound Imaging in Three and Four Dimensions, Seminars in Ultrasound, CT, and MR/, vol. 22, No. 1 (Feb.), 2001: pp. 85-105, (Year: 2001).

Moreno et al. Classification of visual and linguistic tasks using eye-movement features; Journal of Vision (2014) 14(3):11, 1-18.

* cited by examiner (a)

(b)

| EYE GESTURES | | ACTION |
|---|---|---|
| Right Eye | Left Eye | |
| Blink | Blink | Ignore Natural Blink |
| Long Wink | Open | Toggle On/Off Camera |
| Short Wink | Open | Toggle Start/Stop Video |
| Fast Several Blinks | Fast Several Blinks | Toggle Start/Stop Picture |
| Open | Long Wink | Upload Recorded Media |
| Open | Short Wink | Toggle Add/Stop Music to Video |

(a)

(b)

(a)

(b)

Scene selection by eye movement trajectory (a)

★ Define two corners of the rectangle to be cropped    Resultant Rectangle

Scene selection by starring at desired corners (b)

(a)

(b)

(c)

Before

After

METHOD AND APPARATUS FOR A WEARABLE COMPUTER

CROSS-REFERENCE TO RELATED APPLICATIONS

This application is a continuation of the U.S. patent application Ser. No. 16/578,285, filed on Sep. 21, 2019, and entitled METHOD AND APPARATUS FOR A WEARABLE COMPUTER. patent application Ser. No. 16/578,285 is a continuation of the U.S. patent application Ser. No. 15/859,526, filed on Dec. 31, 2017, and entitled METHOD AND APPARATUS FOR A WEARABLE COMPUTER, and now U.S. Pat. No. 10,423,837. The U.S. patent application Ser. No. 15/859,526 is a continuation of the U.S. patent application Ser. No. 15/663,753, filed on Jul. 30, 2017, and entitled METHOD AND APPARATUS FOR AN EYE TRACKING WEARABLE COMPUTER which is a continuation of the U.S. patent application Ser. No. 14/985,398, filed on Dec. 31, 2015 and titled METHOD AND APPARATUS FOR A WEARABLE COMPUTER WITH NATURAL USER INTERFACE, and now U.S. Pat. No. 9,727,790 and granted on Aug. 08, 2017, which is a continuation-in-part of the U.S. patent application Ser. No. 13/175,421, filed Jul. 1, 2011, and entitled METHOD AND APPARATUS FOR A COMPACT AND HIGH RESOLUTION MIND-VIEW COMMUNICATOR which is a continuation-in-part of U.S. patent application Ser. No. 12/794,283, filed on Jun. 4, 2010, and entitled METHOD AND APPARATUS FOR A COMPACT AND HIGH RESOLUTION EYE-VIEW RECORDER, and now U.S. Pat. No. 8,872,910, granted on Oct. 28, 2014. This application is also a continuation-in-part of U.S. patent application Ser. No. 15/400,399, filed on Jan. 06, 2017, which is a continuation of U.S. patent application Ser. No. 13/175,421, filed on Jul. 1, 2011. U.S. patent application Ser. No. 14/985,398 claims the benefits of U.S. Provisional Applications of #62/099,128, #62/128,537, and #62/205,783. U.S. patent application Ser. No. 13/175,421 claims the benefits of U.S. Provisional Applications of #61/369,618, #61/471,397 and #61/471,376. U.S. patent application Ser. No. 12/794,283 claims benefits of provisional application of #61/184,232. U.S. patent application Ser. No. 15/663,753 is now U.S. Pat. No. 10/019,634. The entire content of the above applications are incorporated by reference herein.

TECHNICAL FIELD

Embodiments of the invention relate to wearable computers, digital personal assistants, man-machine interface, natural user interface, driver assistant, privacy, and eye tracking cameras. Through monitoring and making sense of what a user hears, sees and does, the wearable computer anticipates a user's need and proactively offers solutions, hence, functioning like a human helper.

BACKGROUND

Personal computers have gone through an evolution in terms of the form factor and the user interface. In terms of the form factor the evolution path includes desktop, laptop, tablet and pocket. Smartphones are pocket computers. The user interface started with command line and that was followed by graphical user interface. Voice interface became widely available by the introduction of Siri as a digital personal assistant. Siri is the first major step towards personal computers with natural interface. However, Siri is a blind personal assistant, it can hear and talk but she can't see even though every iPhone and iPad has at least one camera. A blind digital personal assistant can have a very limited use because humans are visual beings. A personal assistant can see if and only if she can see exactly what the user of the device sees. In other words, the personal assistant has to be able to see through the eyes of the user to become a true personal assistant. This applies to personal computers with natural user interface as well. Several unsuccessful attempts towards computers with natural user interface can be traced back to not being aware of this requirement. Microsoft's SenseCam is an example.

In a graphical user interface personal computer, the user has to go to the computer to get things done each time. In other words, those computers are reactive. In contrast, a computer with a natural user interface can be proactive; it can anticipate a user's need and offer help just in time or like a human personal assistant. The wearable computer disclosed in this invention relies heavily on camera to capture what a user sees and utilizes image processing to make sense of what is seen. The user can interact with the computer via eye gestures, hand gestures, and voice, as well as a touch screen interface. By having access to what a user sees, one can take pictures or record videos of what he sees without having to hold a camera in his hand and continuously monitoring a screen to ensure the camera is pointed properly. As one tries to capture a moment carefully, he has to split his attention between recording the event and enjoying the experience. In other words, there is a contradiction between focusing on the recording process and enjoying the experience fully. Resolving this contradiction is another objective of this invention.

Human vision and how it works has been well-documented. Generally, a point-and-shoot camera tries to capture a human's binocular field of view which is defined as the overlap of the field of views of the two eyes. Human brain merges the two images that it receives. The high resolution of human eye is referred to as foveal vision or foveal view. This area subtends to a very narrow field of view. Devices that are discussed in this disclosure will capture a subset of the field of view as small as the foveal view and as wide as the whole visual field of view which is made up of the foveal and peripheral view.

The retina in the human eye is a hybrid image sensor that has two types of image sensing cells: cones and rods. Cones create images that have much more resolution than the rods. Cones are located on a very small area on retina called fovea and in this manuscript foveal vision or foveal view is defined as images formed on the fovea. The image formed on the rest of the retina is called peripheral view or peripheral vision. The common field of view between the left and the right eyes is called binocular view. Binocular view does include foveal view. Foveal view subtends to a very small angle which is typically around a few degrees. Binocular view has a field of view between 30 to 60 degrees.

When people talk about what they see, the word "see" generally refers to the binocular field of view. To allow people to capture what they see, the standard point-and-shoot cameras have had a field of view about the binocular field of view of human eyes for decades.

SUMMARY

An embodiment of a Wearable Computer apparatus includes a first portable unit for data gathering from surrounding of a user and providing a natural user interface, and a second portable unit for processing the gathered data from the first unit and taking an action in respond to the received data. The first portable unit includes an eyeglass frame, at least one first scene camera disposed on the eyeglass frame for capturing at least one scene image corresponding to a field of view of a user, at least one microphone, one speaker and one LED to create a natural user interface, and at least one first processor to receive data from the data gathering units in the first portable unit and communicating that data to the second portable unit. The second portable unit is in communication with the first portable unit and includes at least one second processor configured for receiving data from the first processor. The second portable unit also includes at least one interface of a digital personal assistant that receives at least one scene image from the first portable unit and initiates an object recognition procedure to recognize an object in the at least one scene image. Based on the at least one recognized object, the digital personal assistant takes an action that may include providing a feedback to the user via light or audio. In one implementation, the second portable unit is a smartphone.

BRIEF DESCRIPTION OF THE DRAWINGS

For a more complete understanding, reference is now made to the following description taken in conjunction with the accompanying Drawings in which.

DETAILED DESCRIPTION

Figure 1:
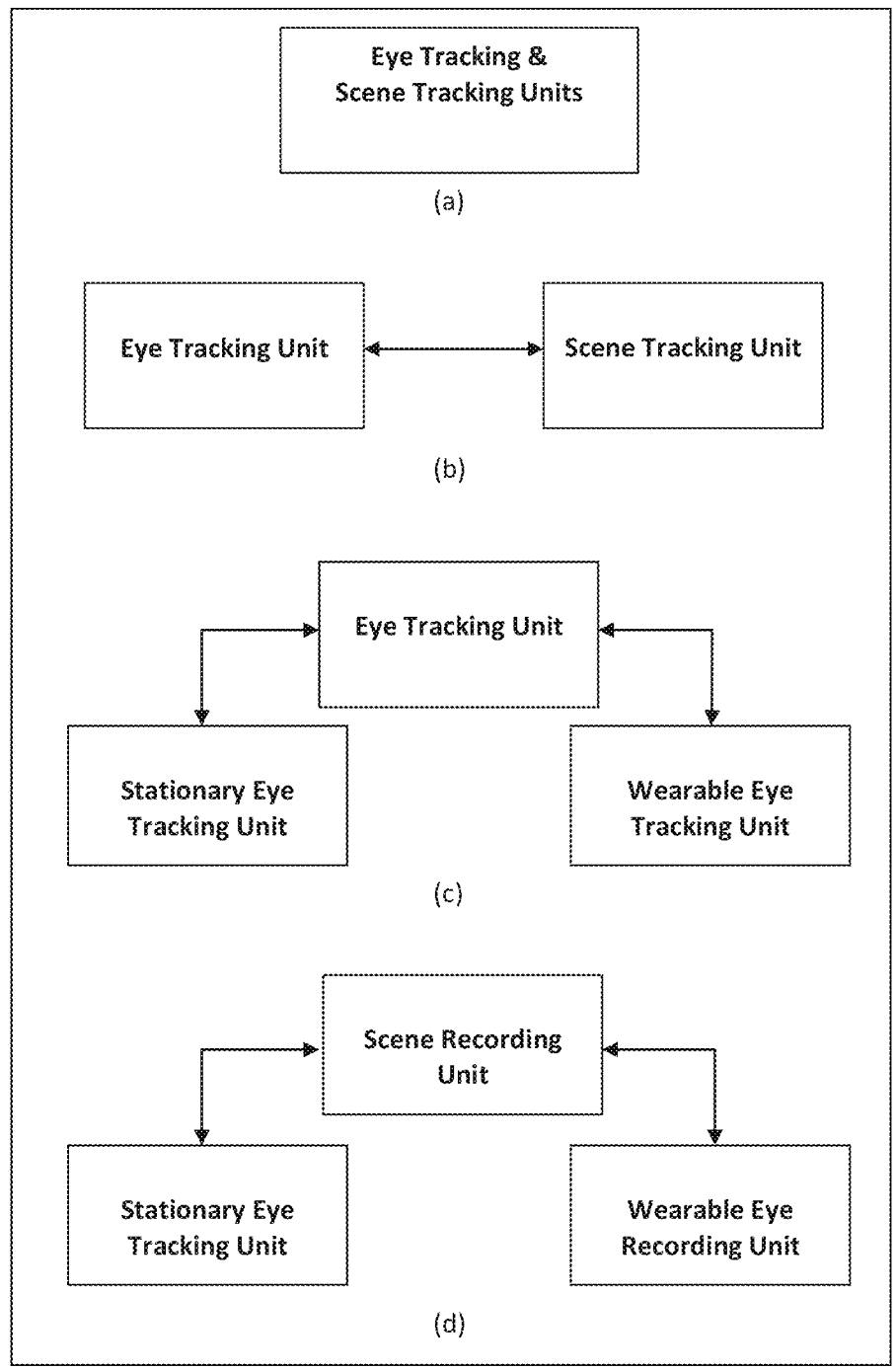
FIG. 1 illustrates various configurations for the two basic building blocks of a Smartcamera.

Referring now to the drawings the various views and embodiments of METHOD AND APPARATUS FOR A WEARABLE COMPUTER are illustrated and described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

In this disclosure, the terms Wearable Computer and Smartcamera are used to refer to the disclosed invention. Wearable Computer term is used when the focus is on the personal assistant aspect of the invention. Smartcamera is used when the main use of the solution is in taking pictures and videos. A Smartcamera is a camera that is aware of a user's visual attention to a scene. It uses eye tracking to find out the gaze-point and the gaze-area of a user. A Smartcamera knows what area of the scene the user is looking at and is aware of the movements of the user's eyes, eyelids, and head. A user may interact with a Smartcamera via eye gestures. A Wearable Computer can also function as a Smartcamera, in fact, it is the most compact form of a Smartcamera.

The disclosed Smartcamera uses eye tracking to follow a user's eyes and mostly it captures the binocular field of view of the user. In general, the field of views of the captured images can vary from the foveal view to the peripheral view.

Form Factor: a Smartcamera has two key sub-systems: an eye tracking unit and a scene recording unit. In terms of physical form factor and physical enclosure, a number of permutations are possible. In one extreme, in FIG. 1a, both sub-systems are co-located within the same enclosure, for example a pair of eyeglasses' frame, and on the other extreme, FIG. 1b, each unit can be housed in a separate enclosure while the two units are in communication via wireless or wires. Either the eye tracking or scene recording unit can be stationary or wearable, as shown in FIGS. 1c and 1d. As shown in FIG. 1c, the eye tracking unit can be stationary and placed in front of a user, or it can be embedded in an eyewear and worn by a user. Similarly, as FIG. 1d shows, the scene recording unit can be stationary, for example fixed on a tripod or it can be wearable like an action camera.

Figure 2:
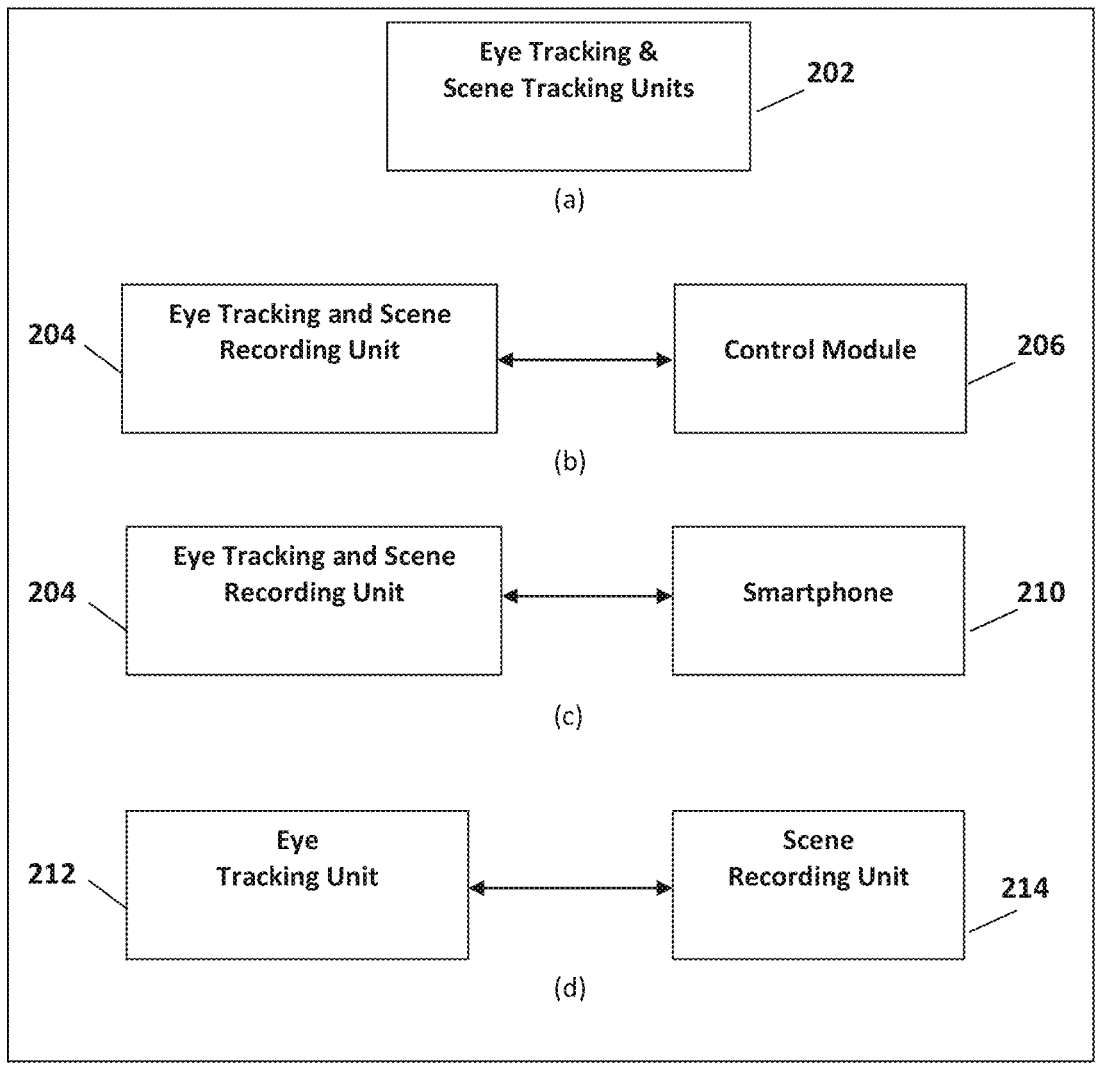
FIG. 2 illustrates various configurations of wearable Smartcamera.
Figure 6:
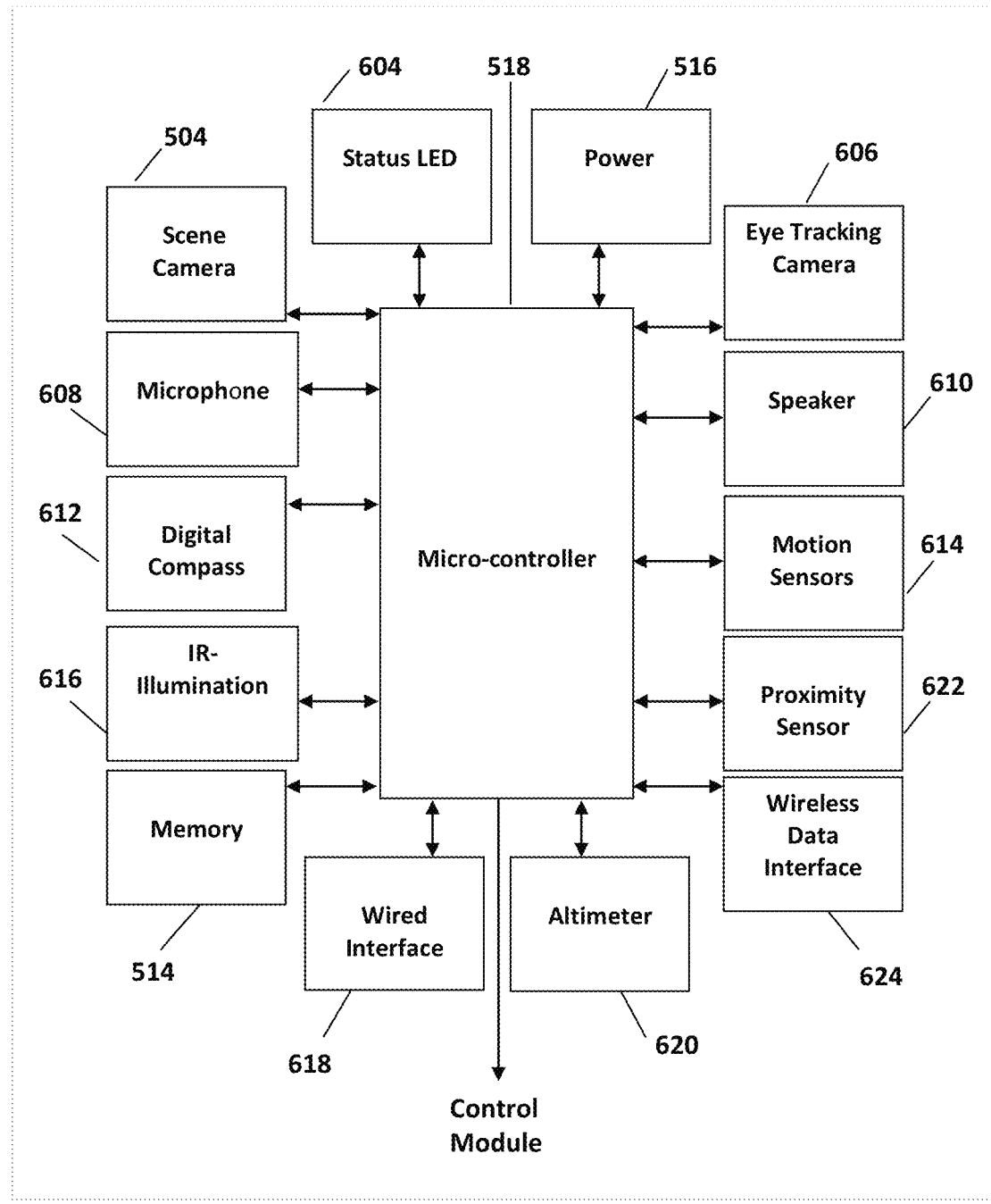
FIG. 6 illustrates the schematic diagram of a wearable eye tracking unit of a Smartcamera.
Figure 7:
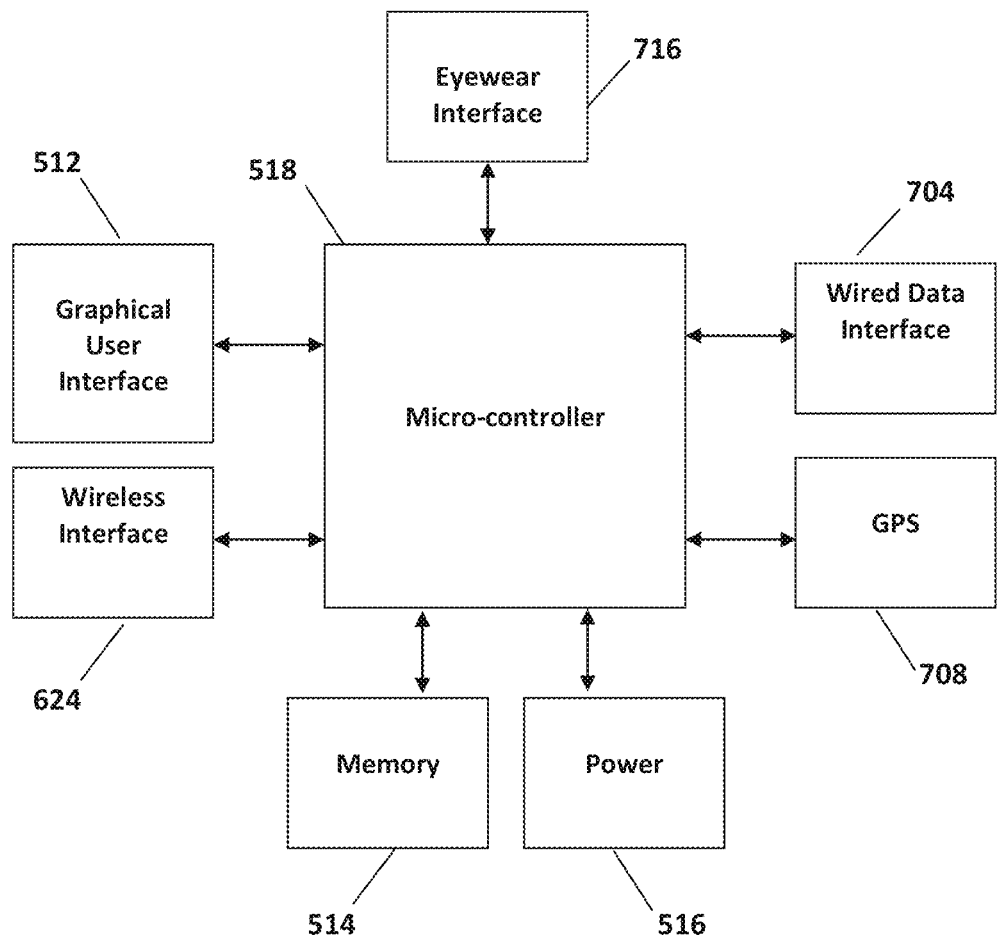
FIG. 7 illustrates the schematic diagram of the control module of a Smartcamera.

FIG. 2 shows various implementations of a wearable Smartcamera. For esthetic and convenience reasons, the design presented in FIG. 2a is split into two separate units that are in communication with each other. As shown in FIG. 2b, the Smartcamera is split into the eyewear 204 and the control module 206. The building blocks of the eyewear 204 are shown in FIG. 6 while the building blocks of the control module 206 are shown in FIG. 7. The control module can, for example, fit in a pocket or can be worn like a necklace, or even be a headwear. In the preferred embodiment for consumers, the control module is a smartphone. The control module communicates with the eyewear through either a wired or wireless connection.

In this disclosure the term Wearable Computer refers to FIG. 2a and the two combinations shown in FIG. 2b, namely, (204, 206) and (204, 210). Both of these solutions are considered as a Wearable Computer with Natural User Interface. FIG. 2c, the combination of (212, 214), is a wearable Smartcamera.

Figure 3:
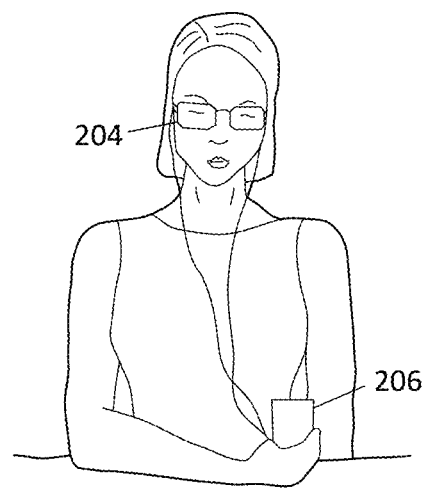
FIG. 3 illustrates two embodiments of a Smartcamera.
Figure 3:
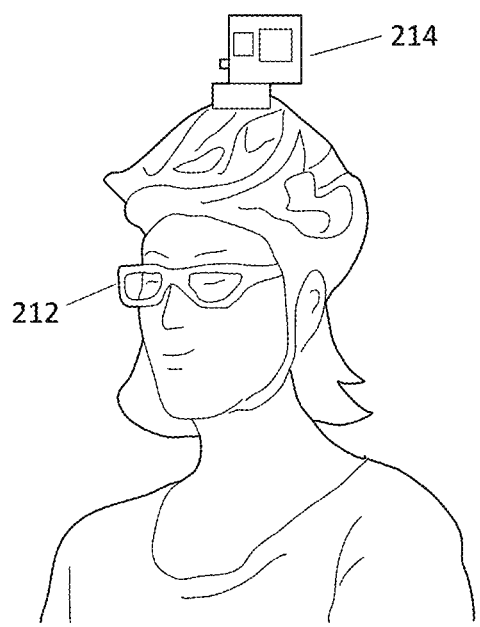

FIGS. 3 shows two actual implementations of a Wearable Computer and a Smartcamera. In particular, FIG. 3a shows a Wearable Computer which refers to the design shown in FIG. 2b. The wearable part 204 is an eyewear and is in communication with the control module 206 via wire. FIG. 3b shows an eye tracking unit 212 and a scene recording unit 214. The scene recording unit is an action camera that can function as an independent unit and it can also be controlled by the eye tracking unit. The simplest control starts with turning on and off the camera with eye gestures and using eye gestures to take pictures and record videos. In a more advanced interaction between the eye tracking unit and the action camera, the action camera becomes aware of user's gaze-point and gaze directions within a scene and will be able to follow a user's eyes, zoom or change its field of view via schemes that will be discussed in this disclosure. An action camera with these capabilities is referred to as Smart action camera in this disclosure.

Figure 4:
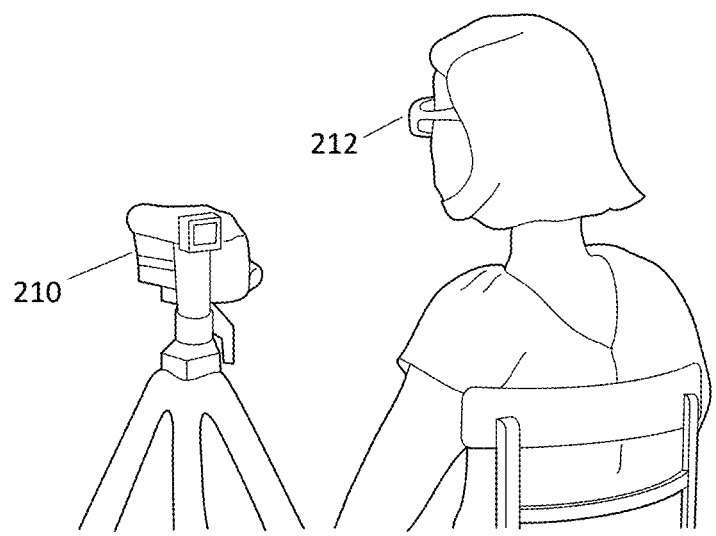
FIGS. 4 illustrates an embodiment of Smartcamera consisting of an eye tracking eyewear and a scene camera mounted on a tripod.

FIG. 4 shows a combination of an eye tracking unit, 212 in FIG. 2c, and a scene recording unit 214 mounted on a tripod, the scene recording unit is a Smartcamera, or a Smart camcorder. The camera mounted on the tripod has at least one wide angle optical unit for capturing images. In addition, it may have actuators to pan and tilt the whole camera or only its lens and image sensor. The scene recording unit shown in FIG. 4 is referred to as a Smartcamera. Similar to a Smart action camera, a Smartcamera can be controlled by eye gestures and it is aware of a user's gaze-point and gaze direction. And since a Smartcamera does not have the size and weight limitation of the Wearable Computer and the Smart action camera, it can include standard zoom lenses to change the field of view in response to the user's attention. By equipping Smartcamera with additional sensors such as location and orientation, one can use an array of Smartcamera placed around a stage or a court and make them all record what one user is paying attention to from many different angles.

Figure 5:
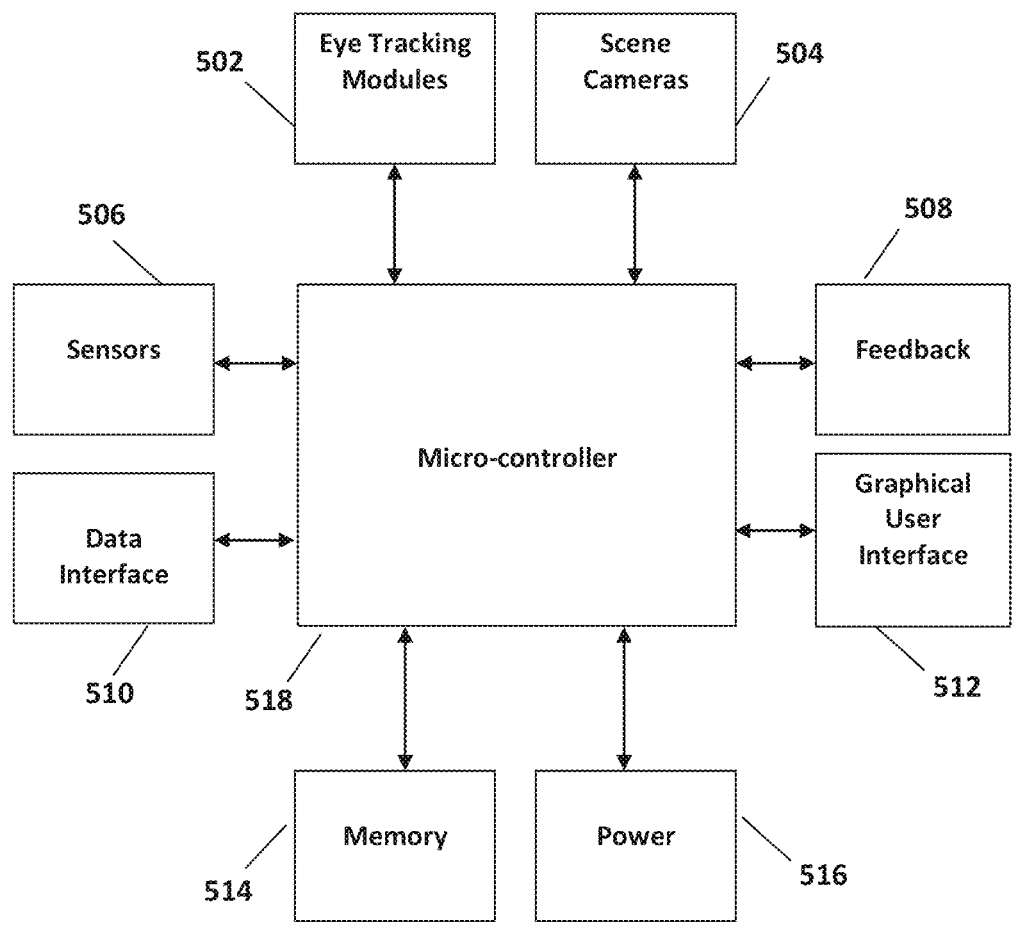
FIG. 5 illustrates the schematic diagram of Smartcamera.

FUNCTIONAL BUILDING BLOCKS: The key building blocks of the Smartcamera introduced in FIG. 1a are shown in FIG. 5. Referring to FIG. 5, the Eye Tracking Modules 502 include small cameras, eye tracking cameras, to repeatedly take pictures of the user's eyes at a known time interval and provide the captured images to the Micro-Controller 518. Included in the eye tracking modules are also infra-red illumination means, such as LEDS to illuminate the eye surface and its surroundings. In the optimum setting, the pupil image will be the darkest part in the images taken by the eye trackers. The eye tracking camera has preferably a common two wire serial data for input and output. This data line is used by the camera to send image data or analysis results to the Micro-controller 518, or the micro-controller uses the two wire interface to send instructions to the eye tracking camera. In the preferred embodiment, two eye trackers are used.

The Scene Cameras 504 are typically comprised of two cameras each having a preferably serial data output. One camera is usually a wide angle camera covering sufficient field of view to cover most of a user's field of view, typically 120 degrees. Depending on the particular application and cost, the second camera can be chosen from a number of options. For example, it is possible to have only one scene camera. When a second scene camera is used, generally, this second camera captures a smaller subset of the scene but at a higher resolution. This does not necessarily mean that the second scene camera has a smaller field of view than the first scene camera. The two cameras can have similar or very different field of views. For example, if the two cameras have similar field of views, one camera can capture the whole view and the other captures the binocular view. Both cameras are in communications with the micro-controller 518 and can be programmed by the micro-controller to output all or only a subset of their captured images. Their frame rate is also programmable and this feature can be used for high dynamic resolution imaging and also super resolution imaging. The micro-controller analyzes the images received from the eye tracking cameras and data from the sensors to generate an output image or video and saves it to the memory or transmits it. More details about imaging sensors and scene cameras will be discussed in another section in this disclosure.

The Sensors 506 include motion sensors such as acceleration and rotation sensors, altimeter, microphones, body temperature sensor, heart beat measurement sensor, proximity sensor, magnetometer or digital compass, GPS, and brainwave sensors to monitor a user's attention via his brainwaves. User's attention can also be deduced from the user's eye movements and its history over a predetermined time span for a relatively fixed position of the head. The eye movements data is used to select a subset of the scene camera's field of view, zoom into a scene or zoom out. The user can also use eye gestures to control the device, for example, to take a picture, or start recording video, post a recording to social media, or turn on or off the device.

The acceleration sensor is used to track the user's head movements. The GPS provide information on the location of the device whereas the digital compass provides information about the orientation of the device. The microphone is used to record what the user hears and also to allow the user to interact with the device via voice. The heart beat monitor sensor is a pair of closely packed infra-red transmitter and receiver that are disposed inside a nose-pad of the eyewear. Inside the other nose-pad a temperature sensor is disposed to measure the user's body temperature over time. All the mentioned sensors are in communication with the micro-controller. A program run on the microcontroller decides what sensors need to be monitored based on the need.

The feedback unit 508 includes audio and visual feedback means. The power unit 516 includes battery, power management, and highly resonant wireless charging subsystems. The data interface unit 510 includes wired and wireless communication. In FIG. 2c, an eye tracking unit 212 communicates with a scene recording unit 214 via a wireless connection. In FIG. 2b, the eye tracking and scene recording unit 204 preferably communicates with the control module 206 via a wired communication link. In general, the data interface 510 can be used to allow a remote viewer to see and hear what the user of an eye tracking and scene tracking unit 204 is seeing and saying. For collaboration purposes, the user may allow the remote viewer to control and steer the scene recording camera. In this case, the micro-controller 518 sends the images from the scene recording camera to the remote viewer and receives the viewer's voice and requested "gaze-direction" from the viewer's mouse or touch screen device. For example in a telemedicine application, the user can be a nurse in a rural area and the remote viewer can be a specialist in another location.

In FIGS. 6 and 7, two sets of building blocks are shown for the case when a two part wearable solution is desired. FIG. 6 shows the building blocks of the wearable unit while FIG. 7 shows the same for the control module. Most of the elements of these two figures have already been discussed when FIG. 5 was covered. The audio speaker 610 allows the processor to provide a feedback or a message to the user via voice. In one embodiment, the audio speaker is a bone conduction speaker. The status LED 604 is a multi-color visible light emitting diode and it can be turned on and off in a predetermined fashion to communicate a message or an alarm to the user. For example, when a user issues a command using eye gestures, the status LED will turn on a green light to inform the command was received and understood but if a command was not understood, a red LED may turn on. A flashing red LED may be used to announce the battery is running low. The status LED must be placed within the field of view of the eyewear wearer. An additional status LED 604 facing outwards can be used to notify others that the device is on, for example when the device is recording a video. The outward pointed status LED can be a single red LED or a dual LED with red and green colors. The red LED will indicate recording while the green is used to indicate the device is on. A status LED that indicates the status of a smart eyewear can reduce other people's concern about being recorded without their knowledge.

Figure 8:
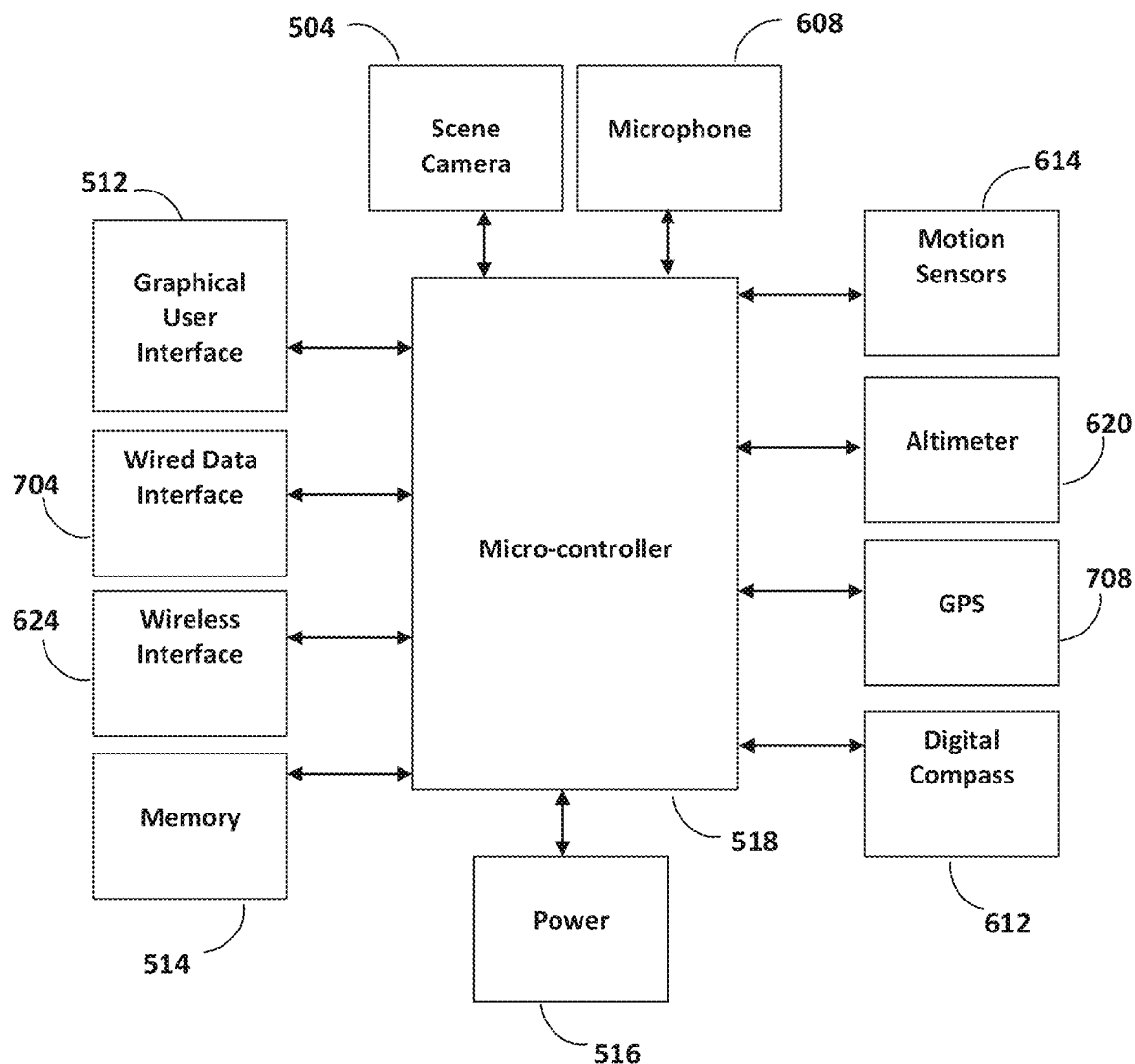
FIGS. 8 illustrates the schematic diagram of a scene recording unit of a Smartcamera.

When the scene cameras are placed in a Smart action camera or a camcorder, there is a slight modification to the design. In FIG. 8 the key building blocks of a Smart action camera or a Smart camcorder are shown. In such cases, generally an eyewear is used to monitor the user's eyes and head movements to find out what the user is paying attention to within the scene, and a separate camera, namely, a Smart action camera, or a Smart camcorder mounted on a stage, is used to record the scenes that a user is paying attention to.

For hands-free, attention-free video recording, proper scene selection, camera movement and image transition can lead to a professionally shot video similar to those of multi-camera effects. For this case, accurate knowledge of user's head and eye movements are crucial. While eye tracking provides gaze direction and gaze-point within a scene, it's the head movement tracking that quickly indicate a user is still looking as the same scene or not. Hence keeping tracking of head and eye movements are crucial to unlock the full potential of the Smartcameras disclosed in this application.

The acceleration and rotation sensor provide linear displacement and angular rotation of the head while an eye tracker monitors the angular rotation of an eye. These three parameters can be represented by three vectors and their vector sum provides accurate information about the gaze direction of a user with respect to a scene over time. For a fixed position of the head, only the gaze direction is needed and that is obtained from an eye tracker. Head rotation or body movement beyond a certain threshold requires widening the field of view of the scene camera. For example, when the brain detects a movement outside the binocular view, the head is turned in that direction to view the area of interest with the higher resolution part of the eye. Widening the field of view allows the scene camera to capture the event faster and put the event into the perspective. One can also use image processing techniques to track the content of the scene and also monitor the scene changes.

Keeping track of a user's visual attention to areas in a scene is achieved by creating an overall motion vector that includes linear head movement, angular head rotation and angular eye movement. In a special case when a user's head has no or slight linear displacement but angular rotation, the eyes and the head rotations may cancel out each other when the user's eyes are fixated on a spot or object. The rotation sensor keeps track of the head movements. The acceleration sensor can be used to measure the inclination of the device.

Wearable Computer with Natural User Interface: As mentioned, the control module can be a smartphone. When a user wears the eyewear 204, apps on the smartphone will be able to see what the user sees, hears, and provide visual and audio feedback to the user. As a result, digital personal assistant apps residing on the smartphone, such as Siri, will be able to see what the user sees. The personal assistant app can then use computer vision tools such as face, object and character recognition to make sense of what the user is paying attention to or to anticipate the user's needs. By utilizing the microphone and the speaker on the eyewear, the digital personal assistant app can engage in a natural conversation with the user, without the user having to hold the smartphone in front of his face to speak to it and let the app hear him. From this perspective, the disclosed wearable computer provides a pair of eyes to the existing blind personal assistants. Consequently, such assistants can play a more productive role in everyone's daily live.

OPERATION OF SMARTCAMERA: Various embodiments of the Smartcamera are designed to record what a user is viewing. To do this, Smartcamera uses eye and head tracking to follow the user's eyes for scene selection and it filters the results selectively to record a smooth video. Unlike eye tracking devices that are used for market research, a Smartcamera does not place a gaze-point mark on any recorded scene image. However, since the gaze-point data is available, the camera can record it as gaze-point metadata.

Smartcamera uses a history of the gaze-points to select a single image frame. Without any history, for recording video and at the very beginning, Smartcamera starts with a wide angle view of the scene. As the micro-controller tracks the user's gaze-points, it also analyzes the trajectories of the eye movements with respect to the scene. Fast local eye movements are generally filtered out in the interest of recording a smooth video. Natural blinks are also ignored. If Smartcamera can't determine the gaze-point from a single eye image, the previous gaze-point is selected. If this persists, the scene camera zooms out. From a predetermined length of the gaze-point history the size of the field of view to be recorded is decided. This of course is a function of the frame rate and video smoothness requirement, a minimum time span that the frame should not change. If there is not much variation or spread in gaze-points and the head is fixed, it is assumed that the user is focusing on a subset of the scene and accordingly the field of view is reduced to zoom in on the scene. The default field of view for an image frame or image subset is about 45 degrees but in general it can be vary between 30 to 60 degrees depending on the user's distance from the scene, larger field of view is chosen for a closer distance. Smartcamera also uses the head motion information captured via the motion sensors to set the frame size or image subset. Generally for head movement speeds beyond a threshold, the field of view is widened to its maximum.

Given that the default value of the selected subset of the field of view of the scene recording camera is about the binocular field of view, which on average is 45 degrees, one can filter out small variations in the gaze-point direction and keep the selected subset fixed when the objection is recording video of what a user sees. A safe gaze-direction variation range to ignore is about 10% of the field of view, which is about 5 degrees when field of view is 45 degrees. No selected subset should be changed based on a single gaze-point or gaze-direction data. Instead and as mentioned, a history of gaze points should be used to decide about a new subset. The length of the gaze-point history depends on the frame rate of the eye tracking camera. For a 30 frames per second eye tracking camera, at least three point gaze history is suggested. It is also suggested to have several gaze point histories that correspond to different time spans and utilize those histories to decide about a new image subset.

A Smartcamera can measure the distance of the wearer from the gaze-point in a scene. This distance can be calculated in two ways: from the gaze directions of the two eyes, or from the dual scene camera images and the knowledge of the gaze-point. Depth extraction from dual cameras is well-known but it is computationally complex. By limiting the computation to a single gaze-point or a narrow area around the gaze-point, one can quickly find an estimate of the depth or distance. In fact one can use this capability to create a scene map of objects of interests with their relative distances from each other. A police officer or a detector may find this feature very handy for fast measurement, documentation and analysis of a scene. Smartcamera can also measure the distance of each of its eye tracking cameras from the wearer's eyes by looking at the reflection of the infra-red light from the eye surface. This distance is needed for the calibration of the Camera to correlate the field of views of the scene cameras to the user's field of view.

The user of the device can initiate the recording manually by pushing a button on the control module or use eye or hand gestures to communicate with the device. It is also possible to let the attention monitoring circuitry to trigger an action automatically. In the later case, the action will start automatically as soon as something that interests the user is detected or a predetermined condition is met.

SCENE CAMERAS

Generally Smartcamera has two scene cameras disposed within the same housing. Each camera has a multi-mega pixel image sensor and uses pixel binning when recording video images. At least one of the scene cameras has a wide angle field of view to capture substantially a user's whole field of view. The second camera can be similar to the first camera but it may be programmed differently. For example, the two scene cameras may operate at different frame rates or have dissimilar pixel binning. They may also capture unequal field of views, for example one might capture the whole view while the other captures the binocular view.

Figure 9:
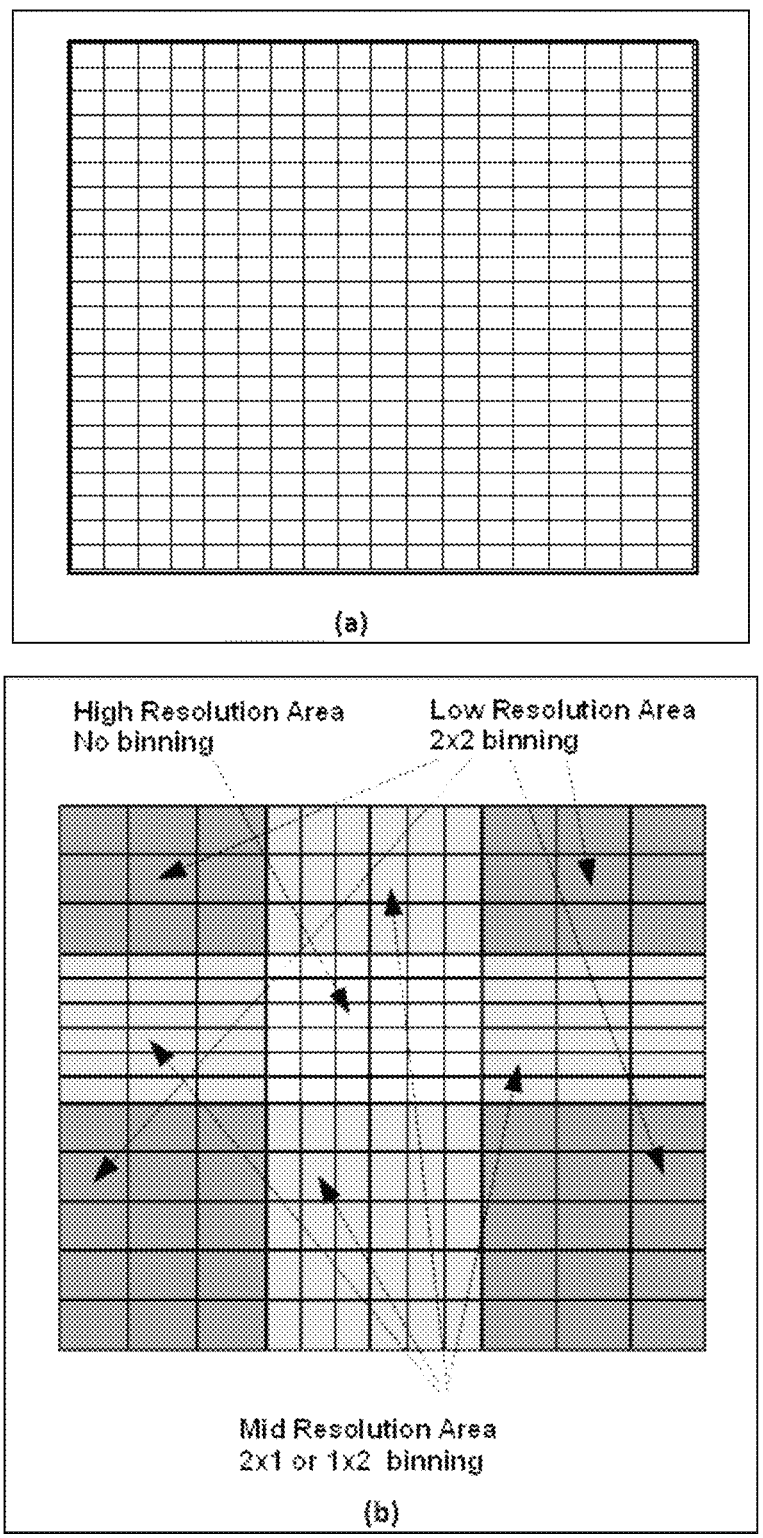
FIG. 9 illustrates an image sensor and a binning scheme that can be implemented in software.

FIG. 9a shows pixels of a typical image sensor. FIG. 9b shows the same image sensor with a hybrid binning configuration designed to partially follow image sensing by a human eye. In the example shown in FIG. 9b, there are three depicted sensor areas: high-resolution area without pixel binning, mid-resolution area with 1×2 or 2×1 pixel binning, and low resolution area with 2×2 binning. This software programmed hybrid binned image sensor can be used to simultaneously capture the whole view and also what a user is seeing, or binocular view, by properly setting various pixels corresponding to different field of views. The high resolution area may correspond to the binocular view and the rest showing the peripheral view. Of course, it is possible to further split the higher resolution area to include the foveal view as well. The basic concept is to bin the pixels of the image sensor of the wide-angle scene camera non-uniformly and use such a scene camera in conjunction with an eye tracking device to communicate what a user is seeing. The resolution of images taken with such hybrid binning can be further increased via post processing using super resolution techniques such as bandwidth extrapolation.

Figure 10:
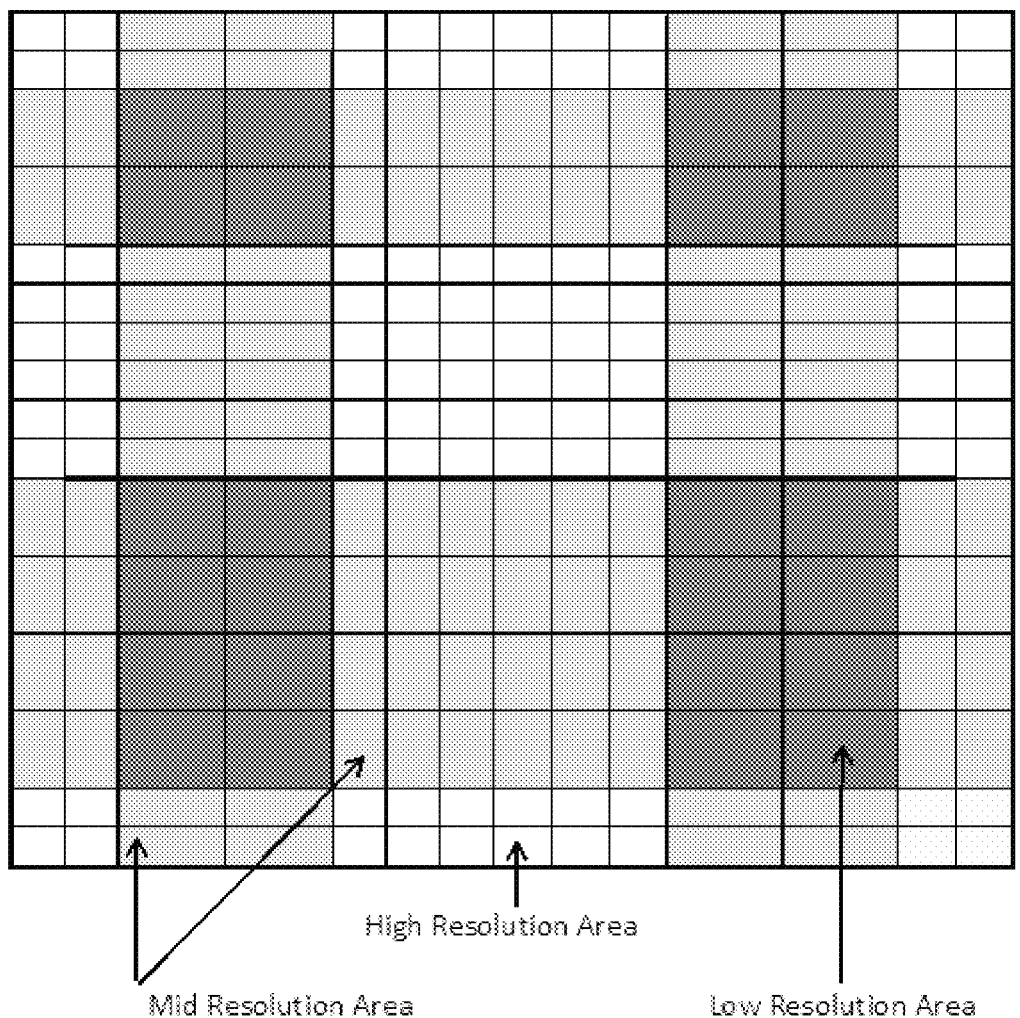
FIG. 10 illustrates a distributed binning configuration for super resolution based imaging.

FIG. 10 shows another binning configuration for a scene camera image sensor. Such binning can be programmed on the fly or it can be set at the beginning of recording period based on a user's preference. The configuration is FIG. 10 is ideal for super resolution enhancement due to its multi high resolution sampled areas as opposed to having only one high resolution area. This configuration is a baseline design for a programmable multi-resolution image sensor for super resolution imaging. By reducing the number of pixels, image compression and storage become easier and faster while substantially the same high resolution image can be recovered via image processing techniques such as bandwidth extrapolation. A multi-mega pixel image sensor capable of only recording video at 1080 p can use such binning followed by a super-resolution scheme to create 4 k, 8 k and even 16 k videos, which is way beyond the current recording capability of the best available consumer electronics image sensors.

A good application for an eye tracking single scene camera is in action cameras. A user may wear an eye tracking eyewear or goggles and mount his action camera on his helmet. By utilizing the hybrid binning that was just discussed in the previous paragraphs, the user can make the images and videos more personal by showing what he saw and what was within the field of view of his camera. Via various post-processing, for example bandwidth extrapolation, it is also possible to increase the resolution of the low and mid resolution areas when needed.

A more advanced action camera can include two wide angle scene cameras: one will function normally and the other one will use the hybrid binning method. The first scene camera captures the whole scene without any bias and the second scene camera records what user's eyes see within the context of the whole view. An alternative is to use the second camera to record only the binocular view with high resolution and record the two video streams. Another alternative is to use two similar scene cameras in the action camera. By using dual eye tracking, one can estimate the gaze-point of each eye. By capturing a subset of each image centered around the respective gaze-point, two well aligned stereo images can be captured easily. Currently, extensive computation is used to create 3D stereo images out of two cameras.

This introduced simplicity can bring down the cost of stereo cameras and also it can make them more accessible to masses due to elimination of post-processing. For solely recording stereo images, hybrid binning may not be required.

Optical Zoom, Optical Image Stabilization, and Optical Pan and Tilt: A Smart action camera is aware of a user's gaze direction and gaze area of interest. It can also switch back and forth between wide angle view and binocular view based on the user's gaze direction. In standard optical zoom lenses, the distance among various lenses along the optical axis is changed to achieve zooming. The total length of the optical lens assembly generally has to increase to achieve optical zooming. This approach is not suitable for mobile devices and action cameras. A new optical zoom lens designed by Dynaoptics folds the optical path and achieves optical zooming with small lateral displacements perpendicular to the optical axis of the lenses. This design has been disclosed to WIPO by Dynaoptics under the international application number PCT/IB32013002905 which is included in this disclosure in its entirety by reference. With such a zooming lens, a Smart action camera can capture higher resolution areas of the scene on demand or automatically by following a user's attention through eye tracking.

Smartcamera disclosed in this invention will use optical image stabilizations to improve the image and video quality. Such techniques have already been used in smartphones. Principles of Optical Image Stabilization have been reviewed and published in two white papers by ST Microelectronics and Rohm Semiconductors. These references can be found and downloaded on internet at the following websites for a thorough discussion and details: 1) www.st.com/web/en/resource/technical/document/white_paper/ois_white_paper.pdf, and 2) www.rohm.com/documents/11308/12928/OIS-white-paper.pdf, both of which are included by reference herein.

As discussed in the above two OIS references, there are two active techniques for OIS. They include shifting a lens laterally within a camera subsystem or tilting the camera module within the camera subsystem. In both case, a lens or the camera module is moved in such a way to compensate for handshakes or small amplitude low frequency vibrations. A new use for such OIS designs is to drive the OIS active elements with an eye tracking signal so the camera follows a user's eye as a user's eye pans and tilts. Currently in OIS, an accelerometer in conjunction with a processor is used to monitor and measure the vibration of the camera and move an optical element to cancel the effect of the vibration. In the application discussed in this invention, an eye tracker is used in conjunction with a processor to measure the eye movements, and a filtered copy of the eye movement signal is used to drive the movable optical element in the OIS assembly.

Figure 11:
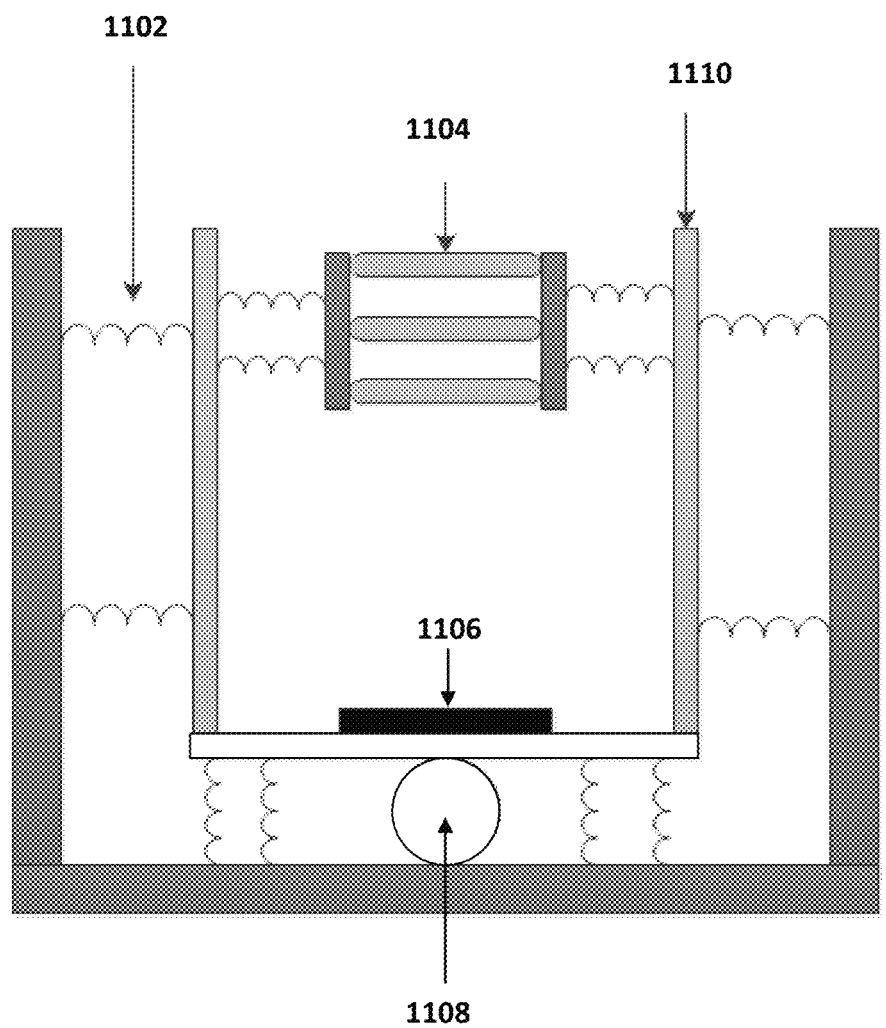
FIG. 11 illustrates an optical image stabilization design to compensate for vibration and allow a scene camera to pan and tilt.

To achieve both optical image stabilization and making a scene camera follow a user's eye, two signals can be added and applied to the OIS subsystem: one signal for cancelling vibration and another signal for moving a scene camera in the direction of a user's gaze-point. To achieve large tilts, it is preferred to use a hybrid approach and create an OIS solution that employs both OIS techniques in the same module. In other words, a new OIS module is designed that utilizes lens shifting and camera tilting. For example, lens shifting will be used to compensate for vibrations and camera titling will be used to make a scene camera follow a user's eyes. With a scene camera that has a sufficiently large field of view, at least twice larger than binocular field of view, a scene camera does not have to be moved continuously. Smaller eye movements can be addressed by selecting a subset of the scene camera and larger eye movements can be accommodated via discrete rotation of the scene camera. Following the figures shown in the two listed OIS references, in FIG. 11, a diagram of an OIS module employing both techniques is shown. Actuators 1102 will move various parts from the group of lenses 1104 and the sub-module housing 1110 that includes lenses 1104 and image sensors 1106. The spherical pivot support 1108 stabilizes and facilitates tilting sub-module 1110 in different directions.

EYE TRACKING CAMERA

Figure 12:
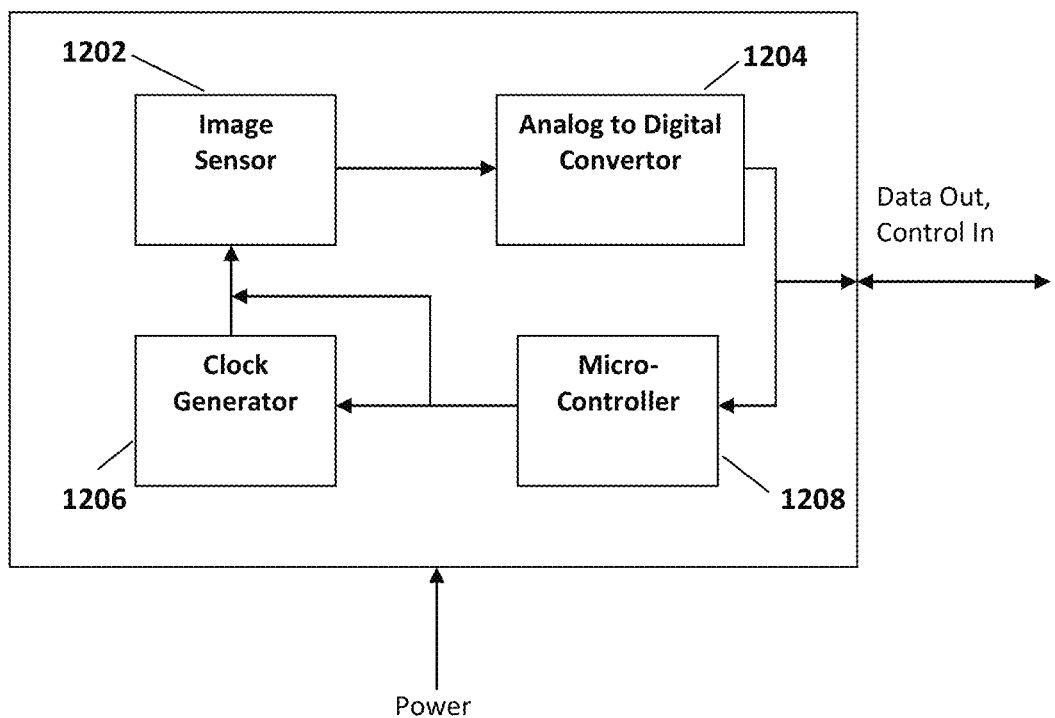
FIG. 12 illustrates a block diagram of the proposed eye tracking camera.

An eye tracker for a wearable Smartcamera for consumers has to have a small form factor, total volume less than 1 mm, consume low power, less than 5 mw, and have the least number of input and output wires, at most 4 wires. To minimize the number of wires serial data interface has to be used. The camera unit must include an oscillator to generate its own clock and perform no processing on the captured pixel values except to digitize the analog values of the pixels. The clock frequency may be adjusted via the supplied voltage to the camera unit. For a minimum programmable control in the camera, the control protocol has to be communicated over the same two wires for the serial data communications. In other words, the serial data is used in a bi-directional fashion between the eye tracker and an outside micro-controller. A simple implementation is to time-share the link, most of the time camera uses the link to send data to the controller and from time to time the controller sends instructions to the camera. All image processing tasks will occur on an outside micro-controller such as 518 in FIG. 6 when needed. In FIG. 12 the building blocks of such an eye tracking camera are shown. Note that the Microcontroller 1208 is basically a set of registers.

As disclosed previously, it is possible that the eye tracking camera can also process the image and provide the analysis results to the processor. Typically, the x-y coordinate of the darkest and bright areas within the eye image is of interest.

ILLUMINATING THE EYE AREAS

Figure 13:
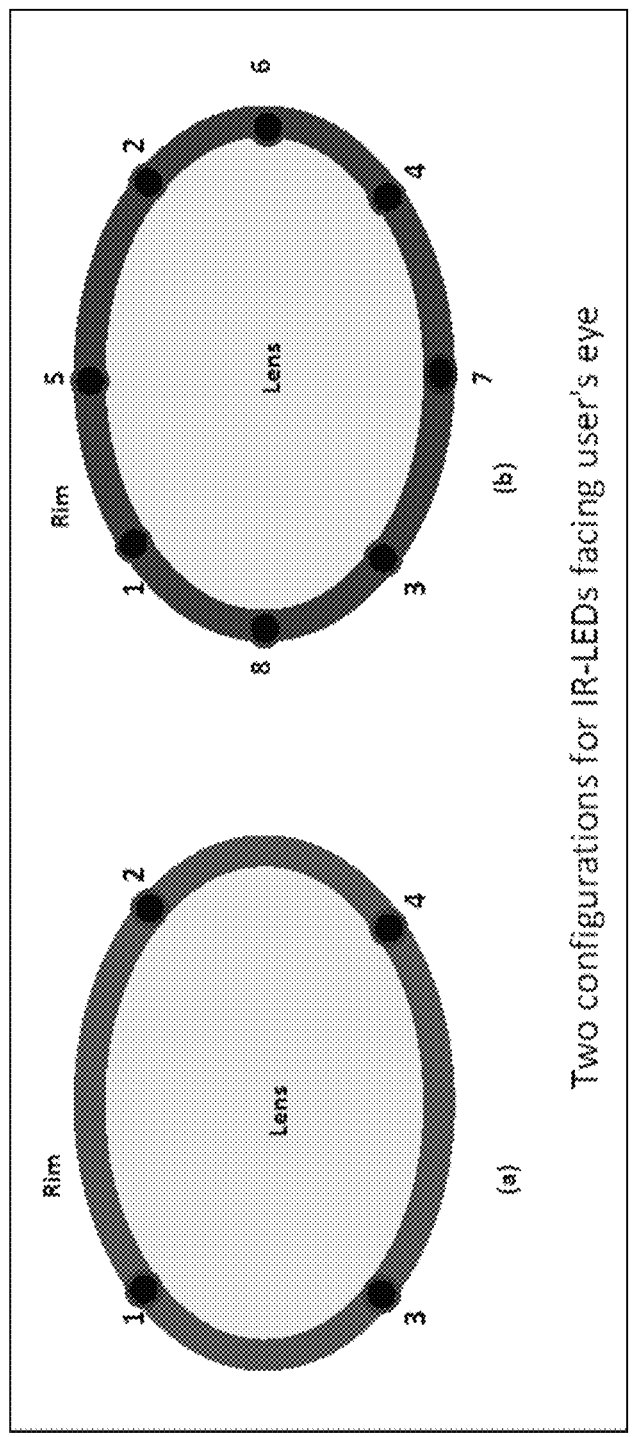
FIG. 13 shows two configurations for arranging infra-red LEDs within a rim of the eye tracking eyewear.

FIG. 13 shows two arrangements for illumination of an eye area with infra-red LEDs. Proper illumination of the eye area is achieved when the infra-red light sources are arranged in such as a way that when an image of the eye is taken by the eye tracking camera, the pupil area will be the darkest part in the image. This means there must be reflected infra-red light reflected from the eye surface, eyelids and eye corners that are collected by the eye tracking camera. As a result of proper illumination of the eye area, one could use signal processing, as opposed to image processing, to locate the pupil and its center in an eye image. Ultimately, this results in an ultra low power and ultra fast pupil detection scheme. With this scheme, eye tracking in kHz range can be easily achieved.

It's well known that infra-red light can damage the cornea and other parts of the eye if the light intensity is above a certain level over a certain time span. For eye tracking eyewears, especially a wearable camera or computer, a user may need to use it for several hours a day. This means for a fixed allowed total dose, the light intensity has to be reduced. If the light source is to be disposed in the left and right area of the rim, a long and skinny light source is needed for each section.

Ideally, one would like to have a continuous ring of infra-red light to illuminate each eye area. This makes it possible to use the image of the infra-red light sources on the eye surface as an indirect locator of the pupil. Looking for a large bright object in the eye image, due to the infra-red source, is much easier than finding a dark pupil. Moreover, the image of the light source can be used to crop the eye image before processing it.

Detecting the Ambient Light: Usually the eye tracking camera has an infra-red band-pass filter to allow in only the infra-red light and block out the visible light in the environment. There is usually some infra-red light in the environment, for example due to sunlight or incandescent light bulbs. To significantly reduce or eliminate the effect of ambient infra-red light in the measurements, the infra-red light source of the eyewear is intentionally turned off intermittently in a predetermined fashion. For example, the light source can be turned off every other frame. When the light source is off, the image sensor detects the ambient light only. But when the infra-red light source is on, the captured image is due to the superposition of the light source and the ambient light. By subtracting these two images, the contribution due to the infra-red light source alone can be obtained, when the image due to ambient light alone is subtracted from the image due to the light source and ambient light.

Image of the illuminating source on the surface of the eye (glint) can be used to simplify eye tracking and eye gesture control and also the analysis of the eye movements. Ideally the source forms a closed loop, for example a semi-rectangular shape as will be shown when discussing illuminating the eye area using optical fibers in FIG. 17. For example, when a user is looking out straight and an image is taken by the eye tracking camera, the image of the illuminated fiber substantially shows the limits of the pupil location as a user rolls his eyes around (up/down/left/right) while looking through the lens area within the rim. This allows cropping of the eye image before processing it. The eye tracking cameras have a wide field of view to accommodate many face types and movements of the eyewear as it moves down on the nose during the use. In addition, each vertical side of the semi 'rectangular' image of the illuminating light source can serve as a measuring stick or ruler for eye movement analysis or measuring the speed of eyelid as it closes and re-opens during a blink. Eyelid opening, blink speed, incomplete blinks can be easier detected and measured with these light guides than the brute force image processing. With such a vertical ruler, measuring the eyelid opening can be reduced to measuring the length of the bright ruler in the eye image. From the eyelid measurements in subsequent image frames, eyelid velocity can be obtained.

Utilizing the Contrast between the Light Reflection from the Eye Surface and Skin for Temporal Eye Gesture Control: The eye surface is smooth and reflects the light like a mirror when it is illuminated by the infra-red light. However, skin scatters the light. This contrast in light reflection property can be used to implement a temporal eye gesture control system based on blinks and winks. A light source illuminates the eye area and a sensor array such as an image sensor monitors the back reflected light. When the eye is closed, the eye skin will scatter the light in all different directions because it is not optically smooth. In contrast, the eye surface does not scatter the light. As a result for the same light source, the peak reflected intensity of the light detected by the image sensor due to reflection from eye surface is significantly larger than that of the skin. The 2D eye image data can be transformed into and examined as a one dimensional signal array and search for the peak detected intensity to determine whether or not the eye is open.

Using Fiber Optic to Illuminate the Eye Area: In the case of mobile eye tracking equipment, infra-red LEDs are attached or embedded in an eyewear to illuminate the eye area. To expose the eye surface so that the pupil is the darkest area in the image, an array of infra-red LEDs is needed. To make eyelid opening measurement simple and yet accurate, a continuous vertical section of infra-red light is needed to illuminate a portion of the eye area. But since infra-red LEDs require attaching wires and since the look and the weight of an eyewear is critically important to people, a fiber optic solution is developed and adopted. Furthermore, placing several LEDs in the rim area increases assembly and manufacturing difficulty.

Fiber optic has been used extensively for delivery of light as it can transmit light over extreme long distances with the minimum loss. This is due to the proper optical design of the optical fiber that once the light gets in, it hardly can escape. In this disclosure, the physical structure of a section of an optical fiber is modified so that it can play a dual role and have excellent transmission along the untouched length and leaky transmission along the modified section. In particular, a fiber optic is used to transmit infra-red light to the rim area of the eyewear. The section of the fiber to be disposed in the rim area is modified so it will heavily leak out the infra-red light. The leaked light will illuminate the eye area as desired.

An optical fiber has a thin light guiding cylindrical center named core, and a thick cylindrical wall protecting the core and keeping the light inside named cladding. The core diameter is typically 10 to 100 times smaller than the cladding. By partially removing the cladding in a controlled fashion, the light in the core escapes out easily in the modified areas. Such a modified optical fiber is analogous to having a water hose that has some holes along its length; when water flows in the hose, some water will leak out from the holes. Via proper modification, the leaky optical fiber can leak the light preferably from one side only, and that's the side facing the eye of the user. The amount of cladding removal can be optimized so that an optimum illumination is achieved.

Figure 14:
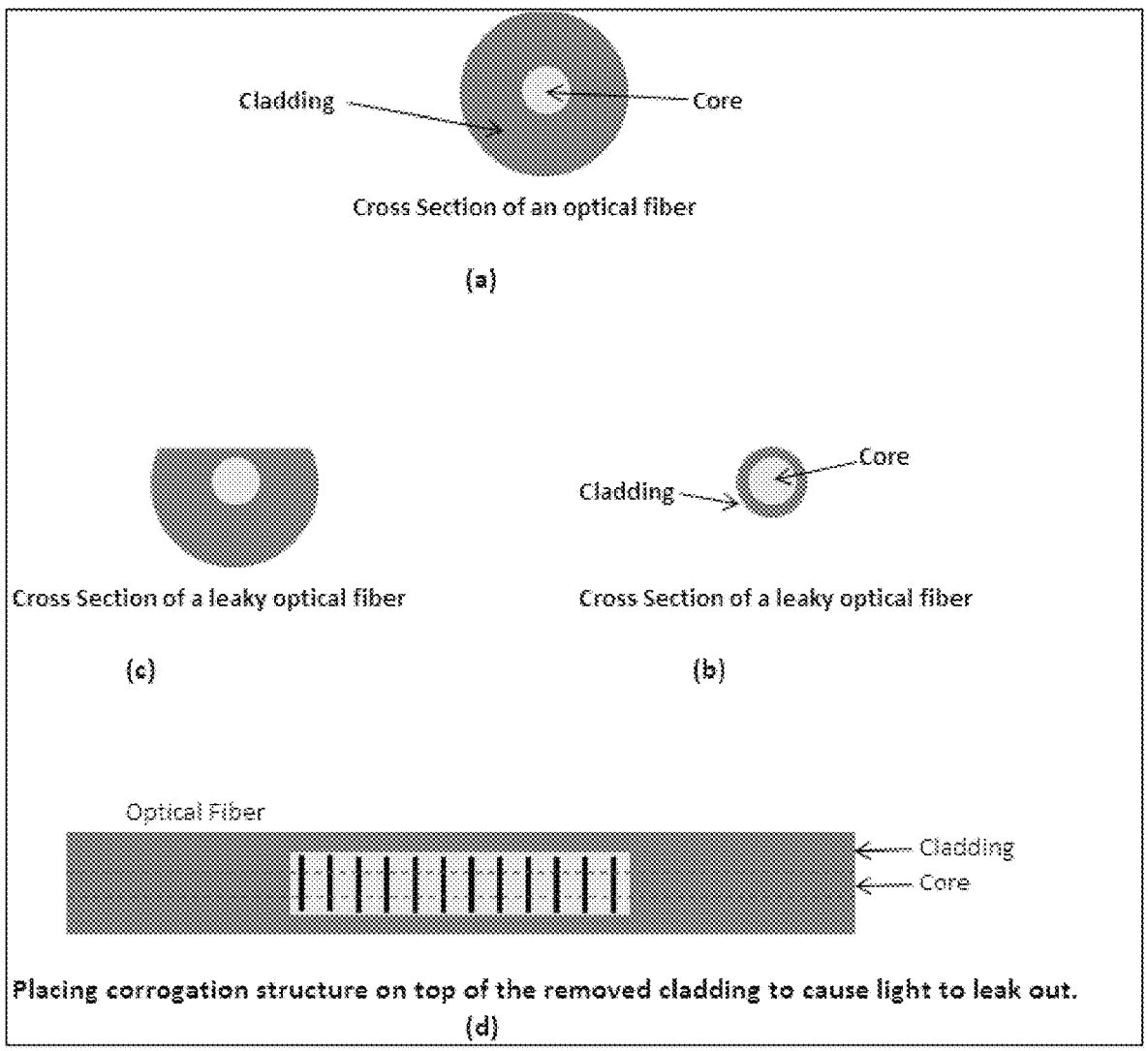
FIG. 14 shows cross sections of a standard optical fiber and a modified optical fiber that is used to serve as an illuminator in the rim area.

Cross section of a standard optical fiber is shown in FIG. 14a. In one design, the cladding thickness of the fiber to be disposed in the rim is significantly reduced so that the fiber will leak out light as light propagates through it. Cross-section of such a reduced cladding leaky optical fiber is shown in FIG. 14b. For such a modified optical fiber, a reflective coating in the rim area may be used to redirect the leaked light in other directions towards the user's eyes (the concave area within the rim the hosts the fiber can have reflective a coating). In another design as shown in FIG. 14c, the cladding is removed asymmetrically from one side to induce leakage on only one side of the fiber and that side is pointed towards the user's eyes. Depositing a properly designed corrugated layer on top of the etched away or the removed cladding section can further increase the coupling efficiency of the light from the fiber to the air and in the direction of a user's eye, see FIG. 14d. An electronically tunable layer may also be placed over the etched area to control the amount of light leakage precisely.

For asymmetrical designs, for example, the flat side of a D-shaped optical fiber cladding can be polished to lower the cladding thickness. It is also possible to create a new fiber by placing the core material asymmetrically inside the cladding during preform. In yet another design, two pieces of optical fibers can be used, one piece is a good transmitter of light at the infra-red wavelength and the other piece of optical fiber is partially lossy at the same wavelength. The lossy section will be embedded in the rim area and the non-lossy fiber will bring the light from the light source to the lossy fiber in the rim area. The light carrying fiber section may be a multimode optical fiber.

Figure 15:
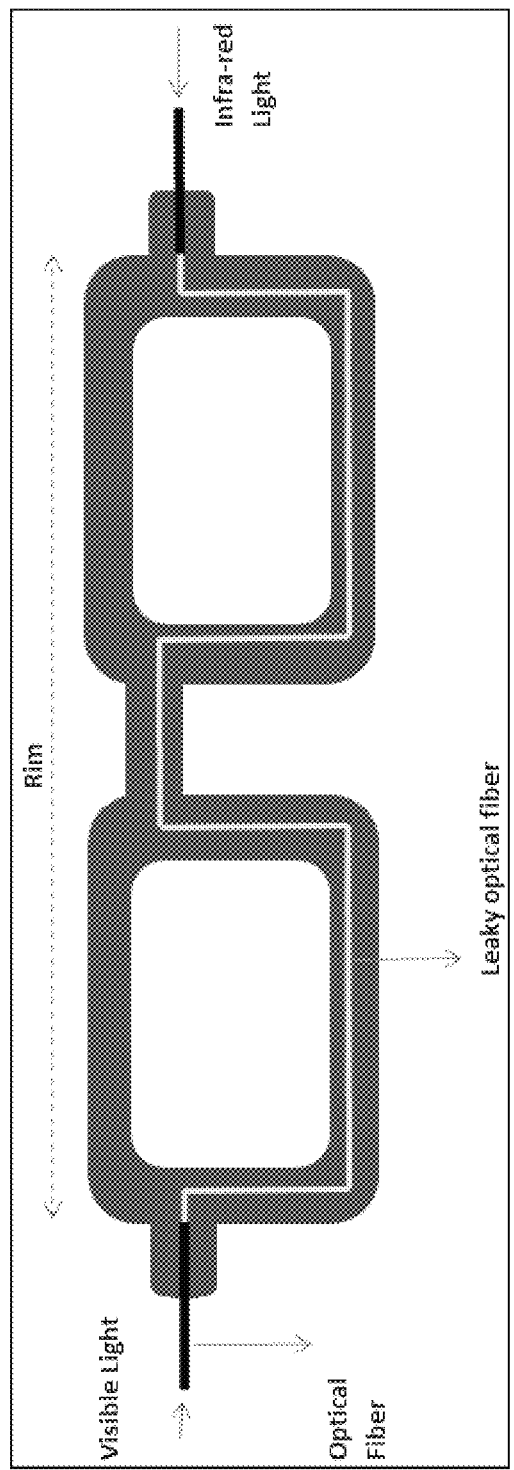
FIG. 15 shows an embedded single strand of modified optical fiber within the rim of the eyewear.
Figure 16:
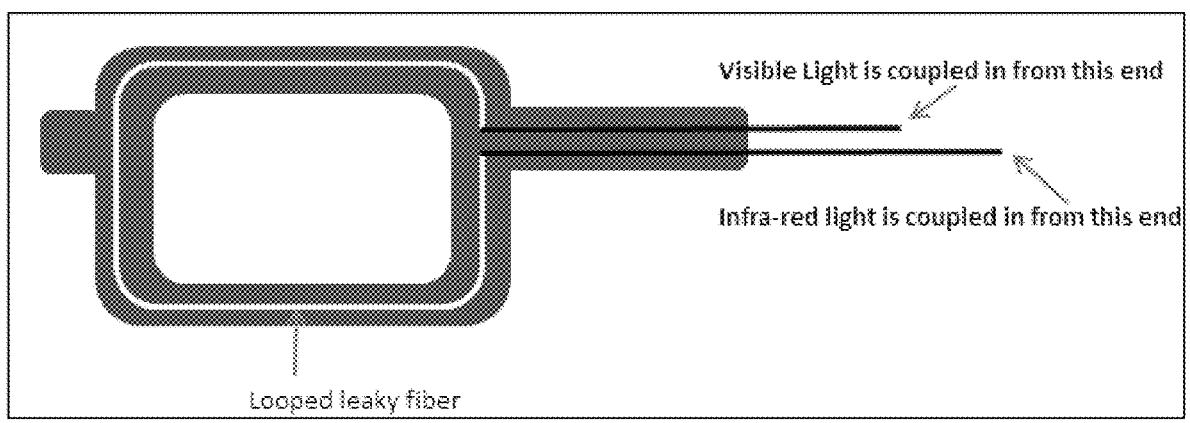
FIG. 16 shows a second configuration for embedding a modified strand of optical fiber within the rim of the eye tracking eyewear.
Figure 17:
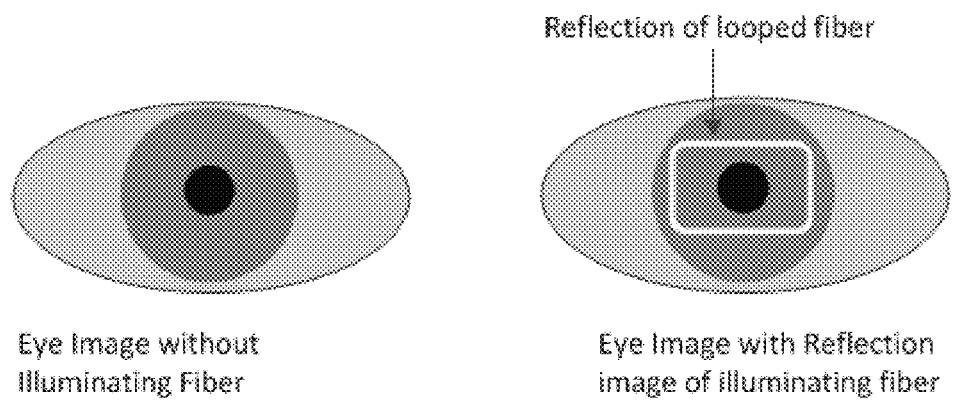
FIG. 17 shows an image of the eye area with and without a looped illuminating optical fiber.

FIG. 15 shows one implementation in which at least one strand of optical fiber is embedded in the rim area of the eyewear. This fiber optic strand also increases the mechanical strength of the frame while serving as an illuminator. As shown in FIG. 15, by coupling a visible light source into the fiber from one end and infra-red light from the other end, the same optical fiber can be used for illumination of the eye area and also for communicating the status and share notification with the user visually, replacing the need for a separate status LED in the eyewear. The visible light may also be coupled in from the same end that the infra-red light is coupled in using an optical wavelength multiplexer or directional coupler. The infra-red light and the visible light sources can be disposed in the control module or in the temple of the eyewear. The light sources can be LEDs or VECSELs, Vertical-External-Cavity Surface Emitting Laser. Rather than running one fiber to illuminate both eyes, it is also possible to use a single fiber in each eye, as shown in FIG. 16, so that a near closed loop light source is realized. In FIG. 17, an eye image without and with infra-red light reflection due to a closed loop light source are shown. The displayed four sides of the closed loop in reality are curved line segments but are shown here as straight segments for illustrative purposes.

Optical fibers can be made of glass or plastic. Multimode fibers can receive a larger percentage of the incoming light from a source. VCSEL based infra-red sources have a higher light coupling efficiency than LEDs and may also be used. In either case, to limit eye exposure to infra-red light, the infra-red light is modulated so that it is turned on just before and during the exposure window of the eye tracking camera.

Additional benefit of using optical fibers in the rim area is for visual feedback and notifications. Various visible colors of light can be coupled into the optical fiber and each color can convey a different type of message. For example, when the device's battery is running low, a red light can flash with various intensities to communicate the severity of the situation to the user. A green light can be used when an eye gesture is understood or executed. A combination of colors—red followed by blue can mean one message, and a red, green, blue sequence could communicate another message to the wearer. Multi-color LEDs can allow creation of a large combination of colors when needed.

Directional couplers or wavelength multiplexers are used to couple in many different light sources into the optical fiber. Lights can also be coupled in from the two ends of the fiber; for example, infra-red from one end and visible light from the other end.

If the light sources are placed in a control module (not in the eyewear) and the fibers run from the control module to the eyewear, the embedded fiber can also strengthen the linking cable between the control module and the eyewear, when the two units are in communication via wires, and protect the wires from extreme occasional bends and stretching. As a result, a thinner jacket can be used to enclose the wires that run between the eyewear and the control module.

Figure 18:
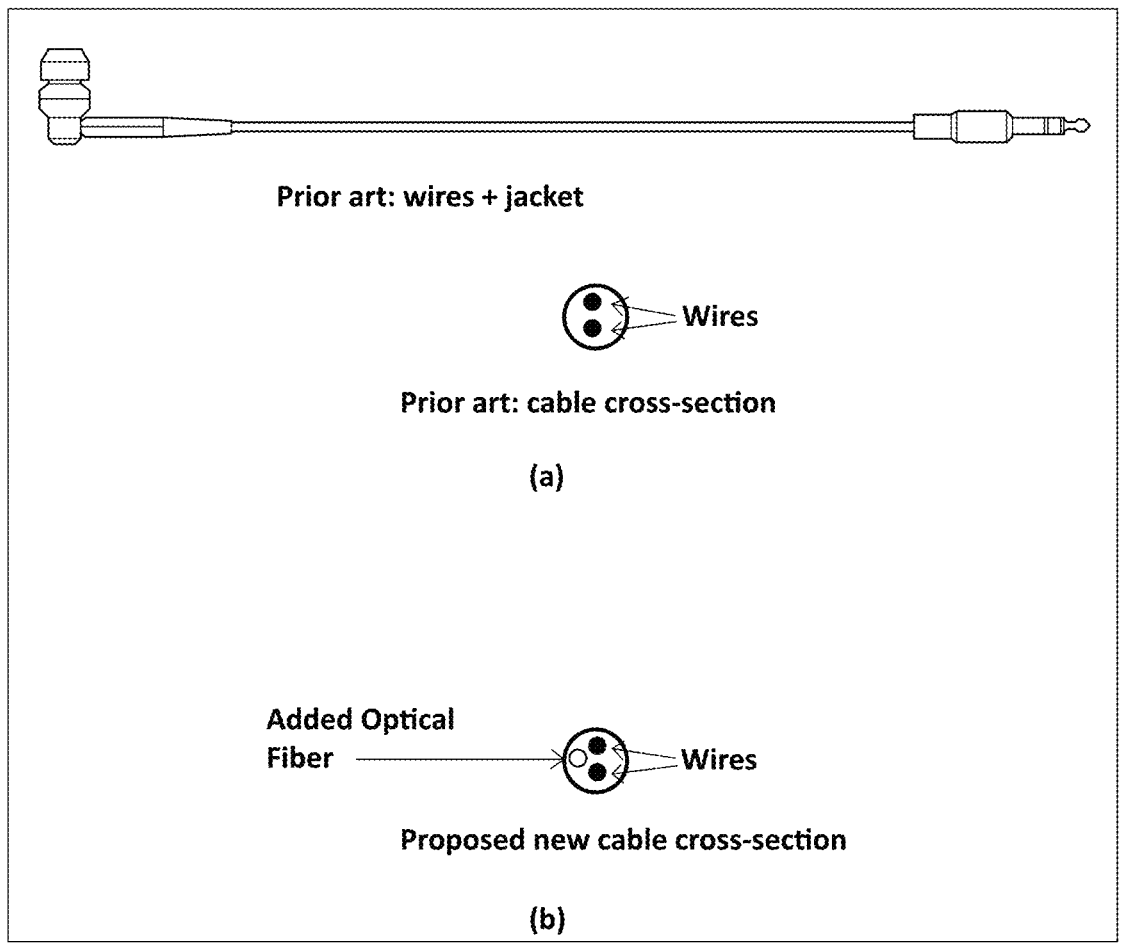
FIG. 18 illustrates a consumer headphone, its connection cable cross-section, and a new reinforced design.

Optical fibers have a spring-like property and resist tight bends by transferring the bending pressure along the length of the fiber. In contrast, thin wires easily bend and are stretched and they never recover on their own. Including a strand of optical fiber along with the signal carrying wires can extend the life of wired cables. For example, cables used in consumer electronic headphones or power cords damage quickly after experiencing repeated bends from the either end. In these cables, the cylindrical jacket (coating) enclosing the wires are typically soft. The wires inside are thin and similar to most other wires, they do not recover once they are stretched. The repeated stretching in different directions (due to bending) over time damages at least one of the wires and that usually makes the cable useless unless repaired. A headphone and the cross-section of its cable are shown in FIG. 18*a*. As shown in FIG. 18*b* and to address the problem that such cables face, at least one strand of optical fiber with proper diameter is included along with the wires to keep the wires from excessive bending at the two ends of the cable and anywhere else along the length.

EYE MOVEMENT, GESTURES, AND GUESTURE CONTROL

Eye movements and gestures can be used to interact with a Smartcamera via an eye tracking program on the microcontroller. Each eye tracking camera takes images of one eye of the user and a microcontroller or a processor analyzes each image to find the pupil, its center, its boundaries, identify and locate the images of the infra-red LEDs in each image, and find the gaze direction of each eye. Eye images are taken at a constant frame rate or at a predetermined time or at specified time intervals.

In one design of the eye tracker camera, the camera module itself takes an image and analyzes it and shares either the results or the image and the results with the processor. In either case, the processor keeps track of the analysis results and forms a history for each parameter of interest. To create a history of the eye movements, a history of the pupil centers is created by recording the location of the pupil center and the time associated with the eye image. This results in an array that presents the pupil's trajectory. Each element of the array has two components: pixel location within the eye image and the time at which the image was taken. The time component can also be the frame number when images are taken at known intervals. From this eye movement trajectory or the location array, one can create a velocity and an acceleration array corresponding to the user's eye movement history. In general, such data over a predetermined time span are used to infer information about the user. For example, when recording a video of what the user sees, the location and velocity arrays are used to set the field of view of a recording scene camera. The location and velocity arrays can also be examined to decode a user command via eye movements or gestures.

When recording a video of what the user is seeing, natural blinks are kept track of but ignored. In other situations, the blink frequency may be used as an eye gesture or as an indicator of the user's physical status. For example, people tend to blink more often when they are tired and their eyelid closure speed is reduced when they are drowsy. In general, each location, velocity and acceleration array is filtered to remove outliers according to predetermined criteria.

Eye gestures may be classified into two groups: temporal or spatial. A blink or a wink is considered as a temporal gesture whereas starring at an object or scanning a scene is considered as spatial eye gestures in this disclosure.

Figure 19:
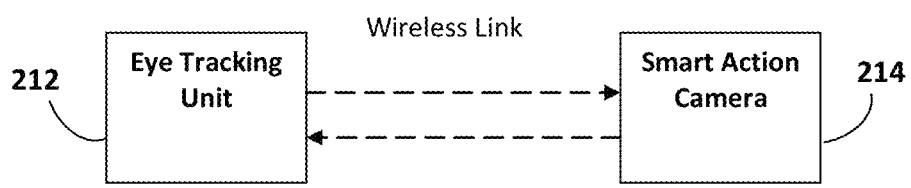
FIG. 19 shows a set of temporal eye gesture commands using blinks and winks that can be used to control an action cam.

Temporal eye gestures are easier to decode and they include blink and wink, or any combinations of the two. Natural blinks have been well studied and characterized, and can be easily indentified and ignored when needed. Intentional blinks, for example fast blinks over a short span of time, can be used as a unique code to interact with Smartcamera. If both eyes are closed at the same time for a brief time, it is interpreted as a blink. While blinks happen simultaneously in both eyes, a wink is a longer blink but occurring in only one eye, while the other eye stays open. FIG. 19*a* lists a set of temporal eye gestures that can be used to control a video recording device, for example a helmet-mount action camera shown in FIG. 19*b* via an eye gesture tracking eyewear. The eye gesture tracking eyewear can be an eye tracking unit 212 in FIG. 2*b* and the action camera can be a scene recording unit 214 or any other action camera with wireless capability that can interact with the eye gesture tracking eyewear. It is assumed that both left and right eyes are being tracked and each eye can be open or be closed to communicate gestures such as blink, short wink and long wink. Referring back to FIG. 19*a*, when both eyes blink repeatedly several time, the processor interprets that gesture as "start taking picture" if the camera is not already in taking picture mode. If it is already taking pictures, it stops taking pictures. In FIG. 19b, the eye tracking eyewear communicates and controls the action cam wirelessly. The action camera in this case can be any existing action camera with wireless interface such as Wifi and Bluetooth.

For pure temporal eye gesture recognition, the microcontroller 518 can use the techniques previously disclosed for eye tracking in a prior inventor's disclosure to locate the pupil or rely only on refection properties of the eye surface and the eye skin to find out the eye is open or closed. A new technique based on the reflectance property of the eye area is disclosed herein. Once the processor 518 (same as microcontroller) receives an eye image, it calculates the statistical parameters of the image data. These parameters include minimum, maximum, average and standard deviation of the pixel values. In other words, the whole image is treated like a one dimensional signal and its statistics is computed much faster than processing the same image. As already mentioned, the eye tracking camera has a serial data output port. As each pixel value is received, it is stored in a one dimensional array and the statistics of the whole array is found. A quick test to determine if the eye was open is to look at the maximum of the array. If its larger than a threshold, there is a good chance the eye is open. A better test is to look at the difference between the maximum and the minimum of the array. When the eye is open, the pupil area registers the lowest pixel value and a number of points register a very large value due to smoothness of the eye surface. When the eye is closed usually more scattered infra-red light is received by the eye tracking camera. As a result, the average value of the pixels is increased. Hence looking at the difference between and the max and the min, and the average value are very good indicator of the eye status, open or closed. To make the procedure more accurate, extra parameters are created for diagnostics. For example, it's useful to calculate a moving average for the minimum, maximum and the average value of the pixels while also keeping track of the global maximum and minimum of each parameter. A moving average and global maximum and minimum can quickly point to the existence of a background infra-red light. A simple technique is described later in this disclosure to properly handle the background light due to infra-red light in the environment. Basically, two consecutive eye images are taken: for the first one, the infra-red light source is turned on and for the second image the source is turned off. By subtracting the second image from the first, the contribution of the environment light is cancelled and the resultant image can be processed for statistical analysis as described. One has to also define an acceptable time span for a blink, short wink and long wink. It's suggested to use one second for a blink, 3-4 seconds for a short wink, and 7-10 seconds for a long wink. But these durations can also be modified by users to allow them to make their own gesture sets. Depending on the frame rate, the number of expected eye closed cases can be estimated for blinks and winks. It's preferred to use two eye trackers to monitor both eyes for robustness and increased functionality. It is also suggested to use the same eye gesture to start and stop an action when possible. The status LED will turn on or flash in a predefined way to let the user his eye gesture was received and executed. The processor can also provide feedback to the user via voice. For example, when the user asks to turn off the action camera, the processor can use the speaker to ask the user to confirm the action.

Given the facts that the skin scatters the infra-red light while the eye surface reflects that light, an eye image data may be filtered via thresholding techniques prior to processing. For example, a double thresholding can be used to keep only the pixels that are smaller than a low-limit value and larger than a high-limit value. The numbers of survived pixels below and above the two threshold levels are good indicators of the eye being open or closed.

Figure 20:
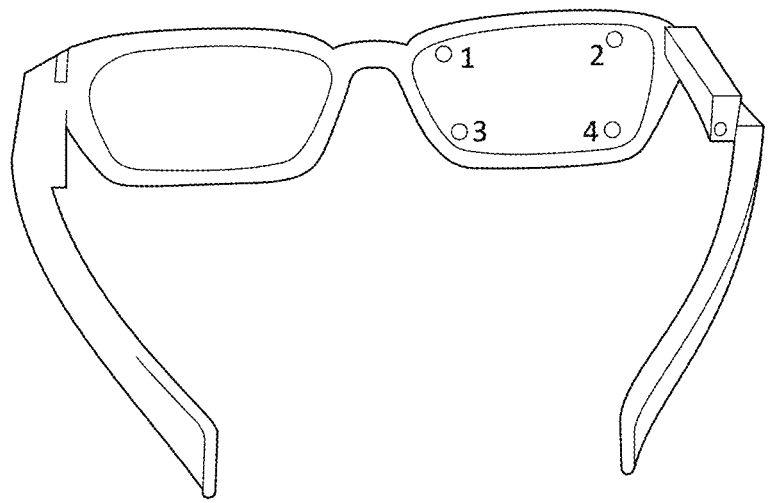
FIGS. 20 illustrates two virtual templates for spatial eye gestures.
Figure 20:
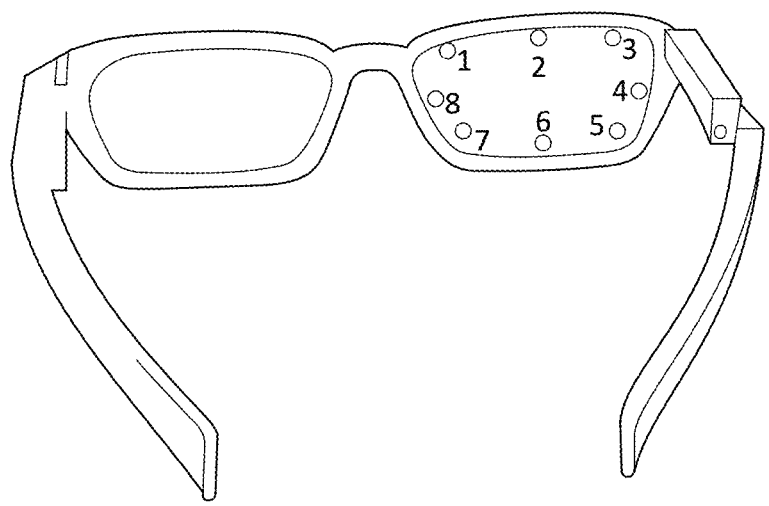
Figure 21:
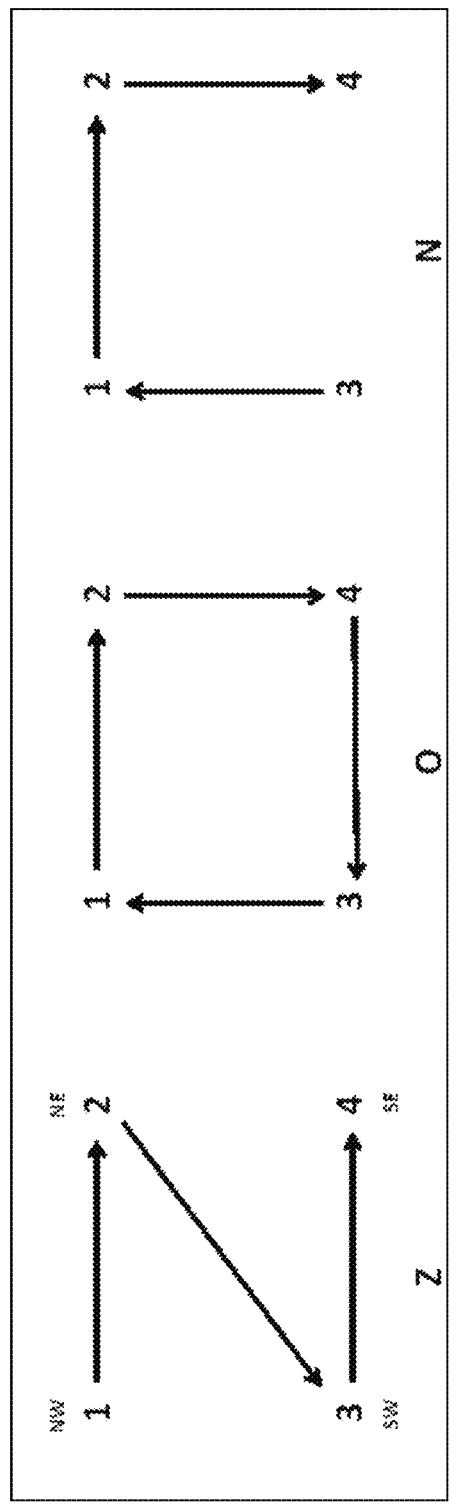
FIG. 21 illustrates three symbols created using spatial eye gestures introduced in FIG. 19.

For an eye tracking device, an interface command set is created by combining a number of temporal and spatial gestures. A template is created and used to allow users to create their own user-defined eye gestures in addition to a default set. A virtual four-node template is shown in FIG. 20a. The virtual nodes are marked by an open circle and named from 1 through 4. These virtual nodes are easy to remember as they are roughly the four imaginary corners of the lens area. By tracing an eye through these four virtual nodes in a predetermined fashion and order, one can create various codes as shown for example in FIG. 21. Each code can stand for a different action by the microcontroller or the processor. For example, a "U" in FIG. 21 might stand for or be assigned to unzooming action and "Z" to zooming.

An eight-node template is shown in FIG. 20b. This template is analogous to a seven segment LED that has six nodes. This means that any character that can be displayed with a seven segment display, it can also be communicated with eye gestures. To communicate a code or a command to the processor, the user will trace his eyes through a number of the virtual nodes, once the code is decoded by the processor, it will execute a predetermined instruction or set of instructions. The processor can use a light, using the status LED, or an audio signal, using audio speaker, to acknowledge the receipt of the user's command.

In general, more complicated trajectories can be defined and decoded in a similar fashion to that of tracing a finger over a keyboard in smart devices to spell a word. For example, in U.S. Pat. No. U.S. 20120242579A1, Swype Inc. discloses such a tracing method on a keyboard, which is included in its entirety by reference in this disclosure.

Human eyes move together when looking at an object. That means for a template-based eye gesture scheme, there are two eyes that can be monitored for the same intended code, command, or signal. This increases the robustness of the detection technique because of the added signal from the second eye.

In the case of an eye tracking eyewear, the tracing area will be the visible area through the eyewear where a lens is usually installed. One can use temporal or spatial eye gestures to start and stop the process. For example a few rapid blinks may tell the eyewear to start reading an eye gesture.

Unique and un-natural eye movement patterns can be detected and executed without a need for any extra command. For example, one can vary the distance between the two pupils by looking at a close and far distance repeatedly. This varies the distance between the two eyes periodically and hence the distance between the two pupils in the images of the two eyes will also vary periodically. Another unique code is to look to the left and right repeatedly, steering both eyes repeatedly to the left and right a few cycles. Other unique combinations include looking diagonally up and down. There are two diagonals: top left to bottom right and top right to bottom left.

TAKING PICTURES WITH EYE MOVEMENTS AND GESTURES

Figure 22:
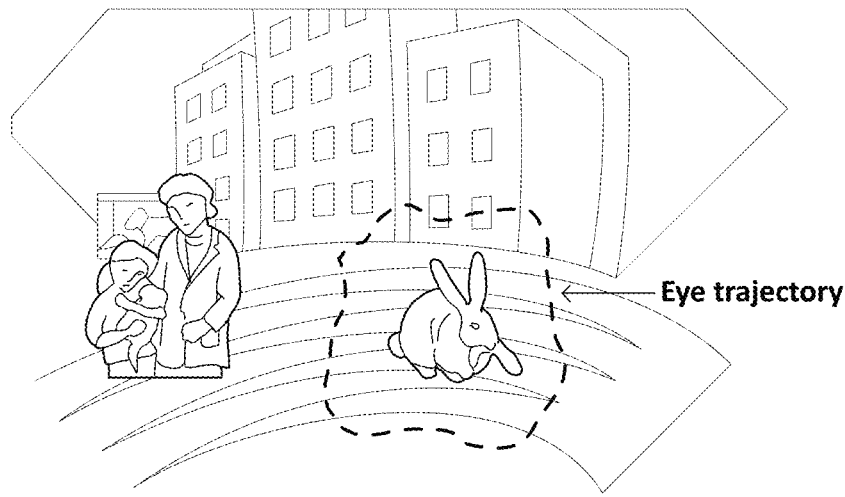
FIGS. 22 illustrates selecting a subset of a scene using eye gestures.
Figure 22:
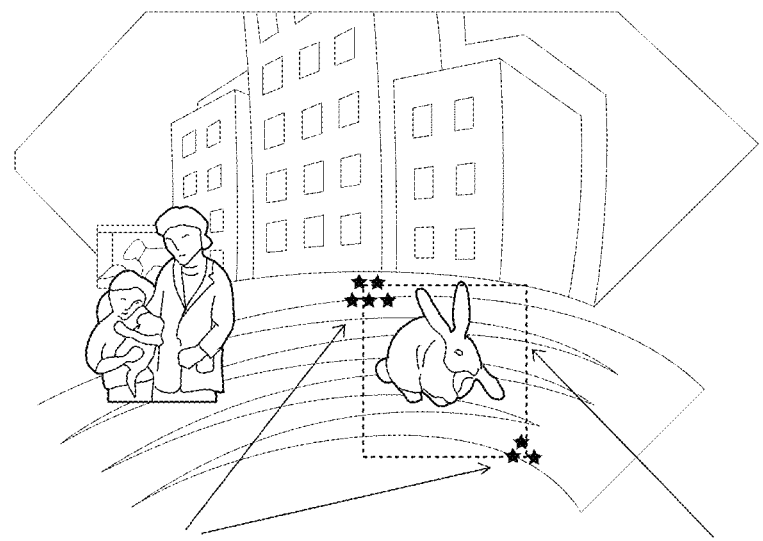

One can use a Smartcamera to capture the whole scene or any subset of it when taking a picture. To do this, the user first instructs the device that he wants to take a picture, for example using fast blinking for a short duration of time, and then uses his eyes to trace an imaginary line (trajectory of his gaze-point) around a subset of interest in the scene. This concept is shown in FIG. 22a. Owing to countless possibilities to draw such a virtual trace, one ends up with a large number of image boundaries for taking an image. This is in contrast with the exiting rectangular or square frames and allows people to include their moods or artistic talents when composing a picture.

Figure 23:
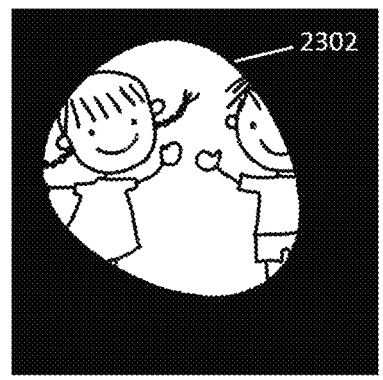
FIGS. 23 illustrates three examples of generated image contours.
Figure 23:
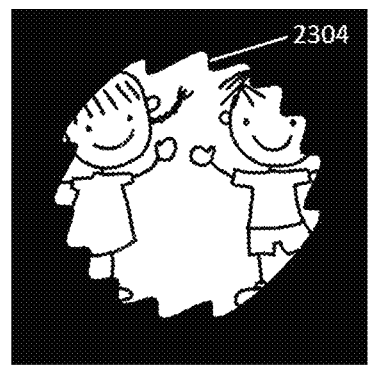
Figure 23:
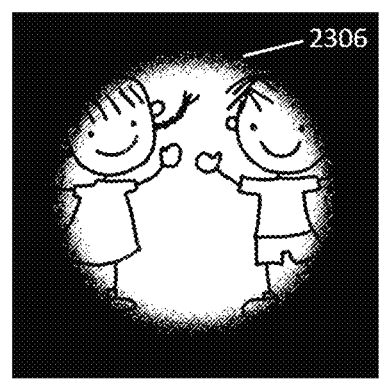

The traced path by a user's eyes can be refined and transformed through predetermined algorithms such as low-pass filtering. For example, one can smooth up the traced trajectory for selecting an image subset by first sending the location coordinates to a low-pass filter and then modulating the filtered trace or contour with one or more mathematical routines or functions. One can also add noise to the generated image contour. As an example, in FIG. 23a, a selected trajectory has been transformed into a round shape 2302. In FIG. 23b, the traced trajectory has been first transformed into a circle and then the circle perimeter has been modulated by a sine wave resulting in contour 2304. In FIG. 23c, instead of modulating the circle boundary with a sine wave, noise has been added to the contour to create another unique image contour 2306. Social networkers may find these new image modification and capturing tools useful to better express themselves.

It's also possible to analyze the content of the image subset and generate an image contour based on its content. The contour may have a colored line boundary and the generated subset maybe presented on a colored background. One criterion for selecting such colors can be based on the color content or the histogram of the image subset. Another criterion can be derived from the motion sensors, the brainwave detector, or even a music that the user is listening to.

To take a picture with a rectangular frame, after instructing the device, one can stare at least at two diagonal corners of the rectangular frame of interest. The processor keeps track of the history of the gaze spots. Areas with more hits or concentration of gaze points indicate user's intended diagonals of the rectangle. The coordinates of a single corner of the rectangle can be found for example from the center of mass of each gaze point cluster. The other two corners are generated automatically using a simple procedure. This concept is shown in FIG. 22b. In the figure, the stars signify the gaze-points of the user. If the coordinates of the two top left and bottom right corners are (x1,y1) and (x2, y2), respectively, then the coordinates of the bottom left and top right corners are (x1, y2) and (x2, y1), respectively.

Figure 24:
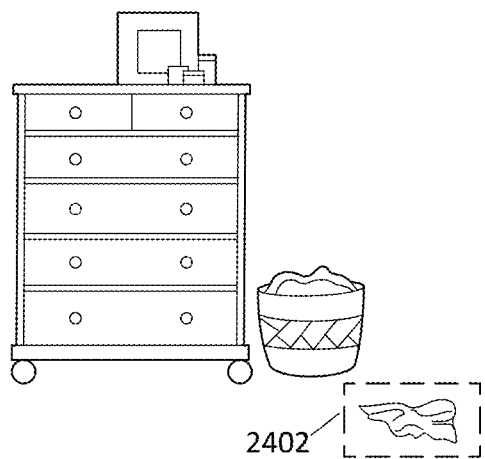
FIG. 24 illustrates an example of image modifications via eye gestures.
Figure 24:
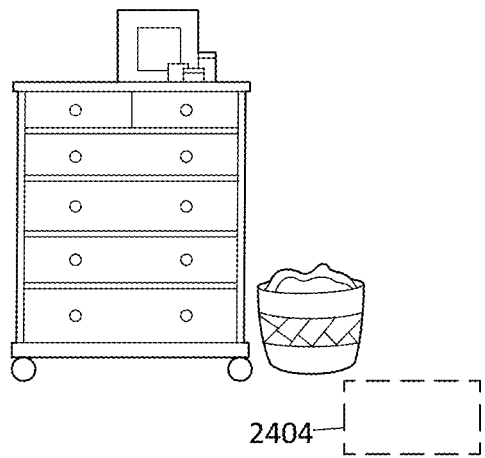

Either of the two techniques just described for choosing an image frame, boundary or contour can also be used to select an image subset and remove the entire image subset or any object within the subset before generating a picture by a Smartcamera. This saves the user the inconvenience of post processing. In FIG. 24 a picture of a scene before (2402) and after (2402) object removal is shown. The black socks on the floor in the original image were deemed undesirable and hence selected and removed. The processor took further steps to fill in the void and create a smooth transition between the removed subset area and the rest of the scene image to make it look normal. It follows that one can do many other image manipulations, such as choosing a subset of a scene and pasting it into another area of the same or any other scene, with eye gestures.

SETTING THE FIELD OF VIEW OF A SMARTCAMERA

Figure 25:
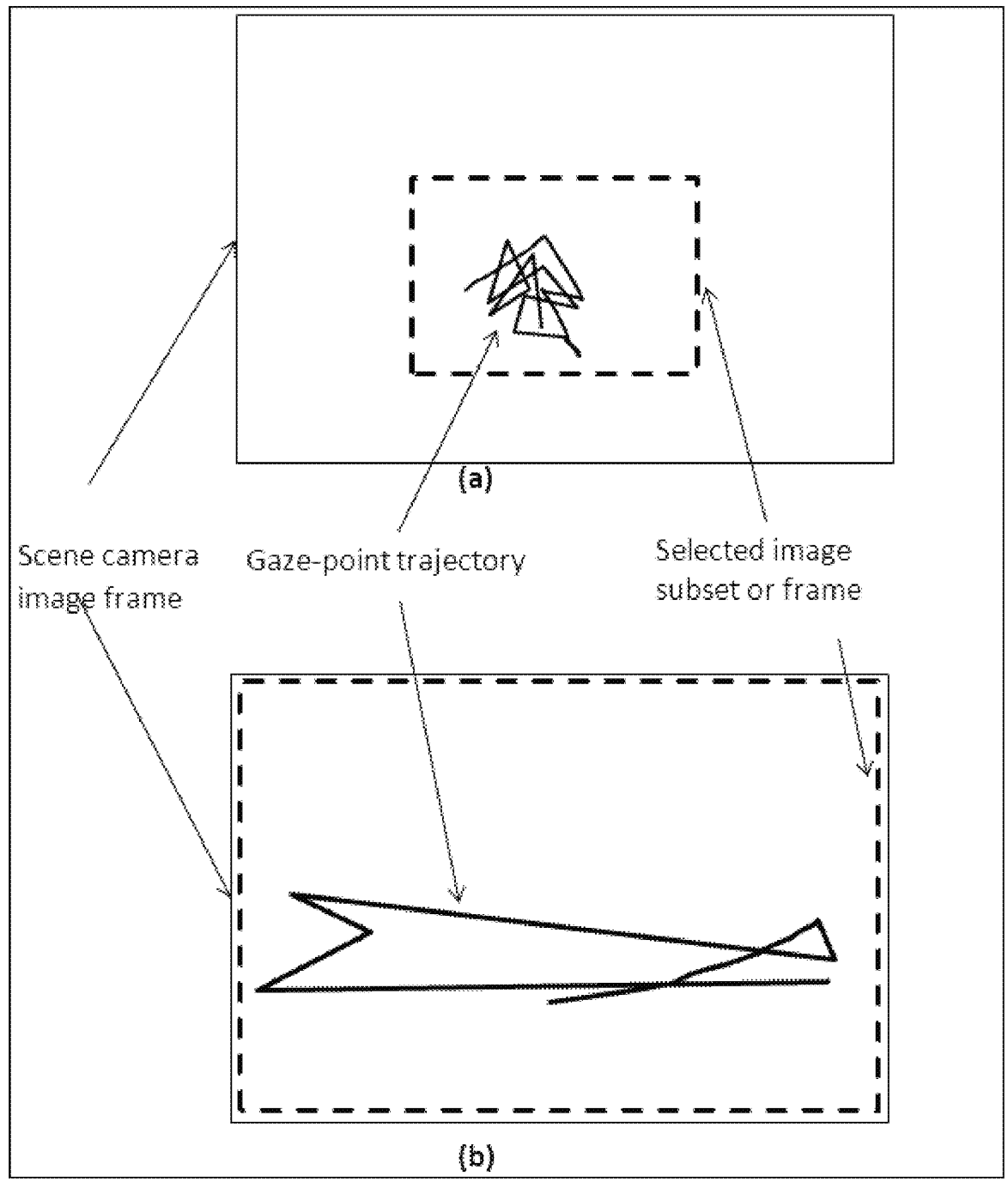
FIGS. 25 illustrates two examples of a user's gaze-point histories and how they are used to set the field of view of the scene camera.

As already mentioned, a Smartcamera uses a history of gaze-points to set the current scene camera's field of view. In FIGS. 25a and 25b two gaze-point histories are shown and the selected fields of views corresponding to those gaze-points are also illustrated with dashed rectangles. A rectangle with a predetermined aspect ratio is fit to the scene in such a way to include the gaze-points. The new field of view will be the selected field of view of the scene camera. When the scene camera can optically zoom into the scene, this method is used to select the zoom level. When the scene camera is incapable of optical zooming, via changing the optical configuration of the lenses, zooming refers to reducing the field of view of the scene camera via selecting a narrower subset of what the scene camera is capable of viewing. This is the preferred method to choose a subset of the field of view. The user's brainwaves can also be used to set the image subset or the field of view. A no or little attention will result in setting the field of view to the widest possible while strong attention will require to zoom based on a gaze-point history over a predetermined time span. Signals from motion sensors are also taken into consideration to set the field of view of the scene camera. For example, when head movement or its rotation speed—measured by motion sensors—crosses a threshold, the camera is fully unzoomed and the subset image corresponds to the widest possible angle of view that the scene camera can capture. Less head movement may indicate more user's attention.

HAND GESTURE CONTROL DIRECTED BY USER'S GAZE-POINT

In addition to eye gesture control, users of Smartcamera can also use hand movements or gestures to interact with the device. This process may be initiated with an eye gesture, such as starring at the user's hand, an eye gesture, or running a program on the processor, followed up by the user pointing to his hand with his eyes and making a hand gesture to issue a command to the processor. The processor first selects a subset of the scene image based on the user's gaze direction, and then analyzes the content of the image subset for hand gestures. The user can also point with his finger at a word or an object to learn more about it. For educational applications, Optical Character Recognition (OCR) and handwriting recognition are used to make sense of what the user is studying or looking at. Once the content is recognized, the processor can provide feedback or take predetermined actions in response to a user's specific need. For example, a kindergarten student can learn spelling of new words that she points at with her finger. Once the Smartcamera sees through her eyes using OCR, it can also read out the words or offer other helps.

Smart Action Camera: The main problem with the existing action camera is that one has to use his hands to control it. This is inconvenient for a skier, a surfer, or a biker who needs to keep his attention on the action. Additionally, a user has no way of knowing if the camera is running out of battery or is in picture taking or video recording mode. Once a user pushes a button on a mounted camera, he hopes his intended action goes through but many times that is not the case due to the lack of a noticeable feedback to the user. During recording, a user of an action camera has no idea which way his camera is pointed at. Lastly, a user of an existing action camera can't change the field of view of his action camera, or utilize an optical zoom lens to zoom in on what he wants. All these problems can be solved with the solutions that have been already presented in this invention, as discussed below. A new action camera that solves those issues is referred to as Smart action camera in this disclosure.

As shown in FIG. 3b, a Smart action camera comprises of an eye tracking eyewear and a mountable scene recording action camera. The two units communicate with each other wirelessly and a user can use eye gestures or voice to control the Smart action camera. The Smart action camera can provide feedback to the user a visible light signal or voice. The Smart action camera is calibrated against the user's field of view and will be able to follow a user's eyes or a user's command to zoom or unzoom. FIGS. 2c, 3b, 6, 7, 9b, 10, 11 and 19 are directly related to the implementation of a Smart action camera. The status LED 604 and Speaker 610 provide visual and audio feedback to the user. The motion sensor 614, digital compass 612 and scene camera 504, all common on both units, and the eye tracker camera 606 on the eye tracking eyewear allow calibrating the Smart action camera's scene camera with respect to the at least one eye of the user. Once such a calibration is established, the action camera can easily follow the user's eyes via the wireless data interface 624. The temporal eye gestures listed in FIG. 19 can be used to easily control the Smart action camera or any other action camera via a wireless link. However, only a Smart action camera can zoom or change its field of view, and is aware of a user's gaze direction within a scene.

STATISTICAL EYE TRACKING METHOD

A statistical eye tracking method based on the properties of the reflected light from an eye area is disclosed herein. With this technique, one can find a coarse estimate of the gaze direction of an eye from the image of the eye taken by an eye tracker unit. This eye tracking approach is appropriate for video recording applications that do not require zooming less than the binocular field of view. A Smartcamera based on this eye tracking technique is analogous to the point-and-shoot cameras; it has a limited zooming capability and a reduced complexity and cost.

In this disclosure, already a statistical method was discussed for temporal eye gesture control which allowed the micro-controller to decide if a user's eye was open based on an eye image taken by the eye tracking camera of an eye tracking unit. Before processing any eye image to estimate a gaze direction, one has to make sure the eye is not closed.

An eye image taken by the eye tracking unit is a rectangular black and white image. Since the eye tracker camera has a large field of view to accommodate various face types, its images should be cropped before processing. The cropping boundary is decided based on the reflection of the infra-red light from the eye surface and the eye area. Once the eye image is cropped. Depending on the image quality, it may be useful to replace the bright pixel values with an overall average value and apply a median filter to remove outliers in the cropped image. To find the pupil's location in the eye image, the rectangular cropped eye image is split into equal sub rectangles and the average value of the pixels within each rectangle is found. The rectangle with the lowest average value is chosen as the indicator of the pupil and its center is selected as the center of the pupil. This center is the indicator of the gaze direction of the user. The width of the sub rectangle is preferred to be less than half of the pupil's width in the eye image. The height of the rectangle should be at most almost equal to the width.

If the eye tracking and the scene recording units are embedded in the same housing, then the location and orientation of the scene recording camera is already known with respect to the eye tracking camera. To map a user's field of view to the scene recording camera's field of view, the locations of the maximum reflection points on the cropped eye image is used to find the distance, orientation, and location of the eye tracking camera with respect to the eye surface. Once a mapping is established, the gaze direction is mapped to a gaze point in the scene and hence to a point in the scene image. A rectangular subset of the scene image centered around the gaze point whose field of view is about the size of the binocular field of view is selected and saved as the generated output image corresponding to gaze direction estimated from the eye image. Again, a history of the gaze points can be kept and used to select and create a different subset of the scene image corresponding to the last eye image. The generated subset can be larger than the binocular field of view. For example, when the camera starts to output the first image, there is no previous history. In this case, the full scene image should be displayed as the output image.

If the scene recording unit has a different housing, for example, if it's an action camera, the field of view of the eye and the field of view of the scene camera need to be related and mapped to each other. For a Smart action camera, the motion and position sensors are used to establish the mapping and calibration. Additionally, the eye tracking unit's scene camera can be used to verify or calibrate the two scene camera with respect to each.

A DRIVER ASSISTANT APPARATUS AND METHOD BASED ON A SMARTCAMERA

Figure 26:
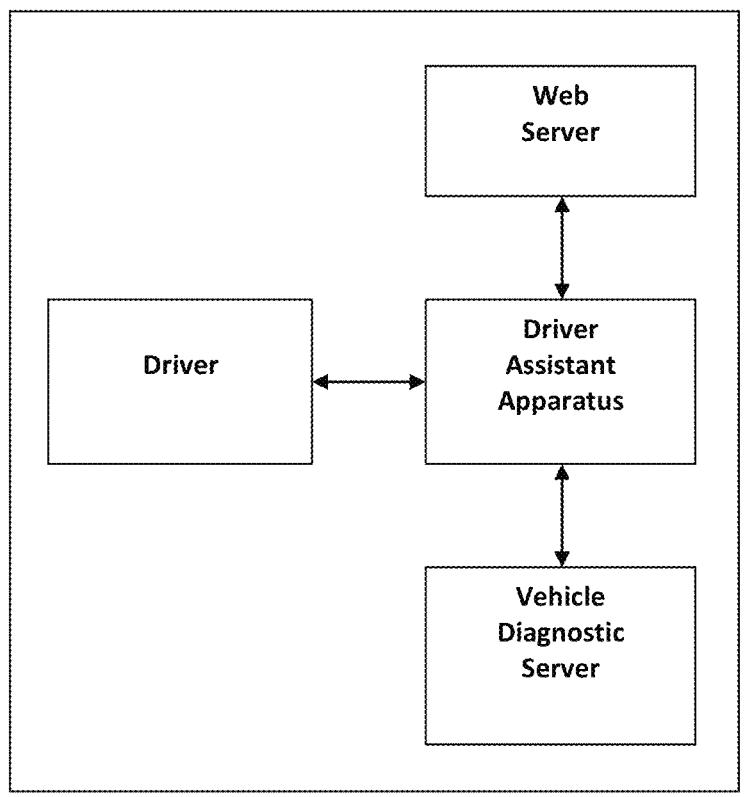
FIGS. 26 depicts the four building blocks of the proposed driver assistant apparatus.

Currently, there are eye and head tracking devices that can alarm a driver when the driver is drowsy or is falling asleep. There are also navigation maps and apps that provide information about the road and direction. All these new tools are useful but none can function like a real person. For example, none can ask the driver why he went through a red light or did not stop at a stop sign because they can't see the road and what the driver sees. An ideal driver assistant will function like a human who is sitting on the passenger seat, observing the driver, the road, the car, engaging the driver in a conversation, and many more that only a human can do. A system view of this driver assistant is shown in FIG. 26. As shown in the figure, the proposed driver assistant is in communication with the driver, its web server, and the vehicle's diagnostics server.

Figure 27:
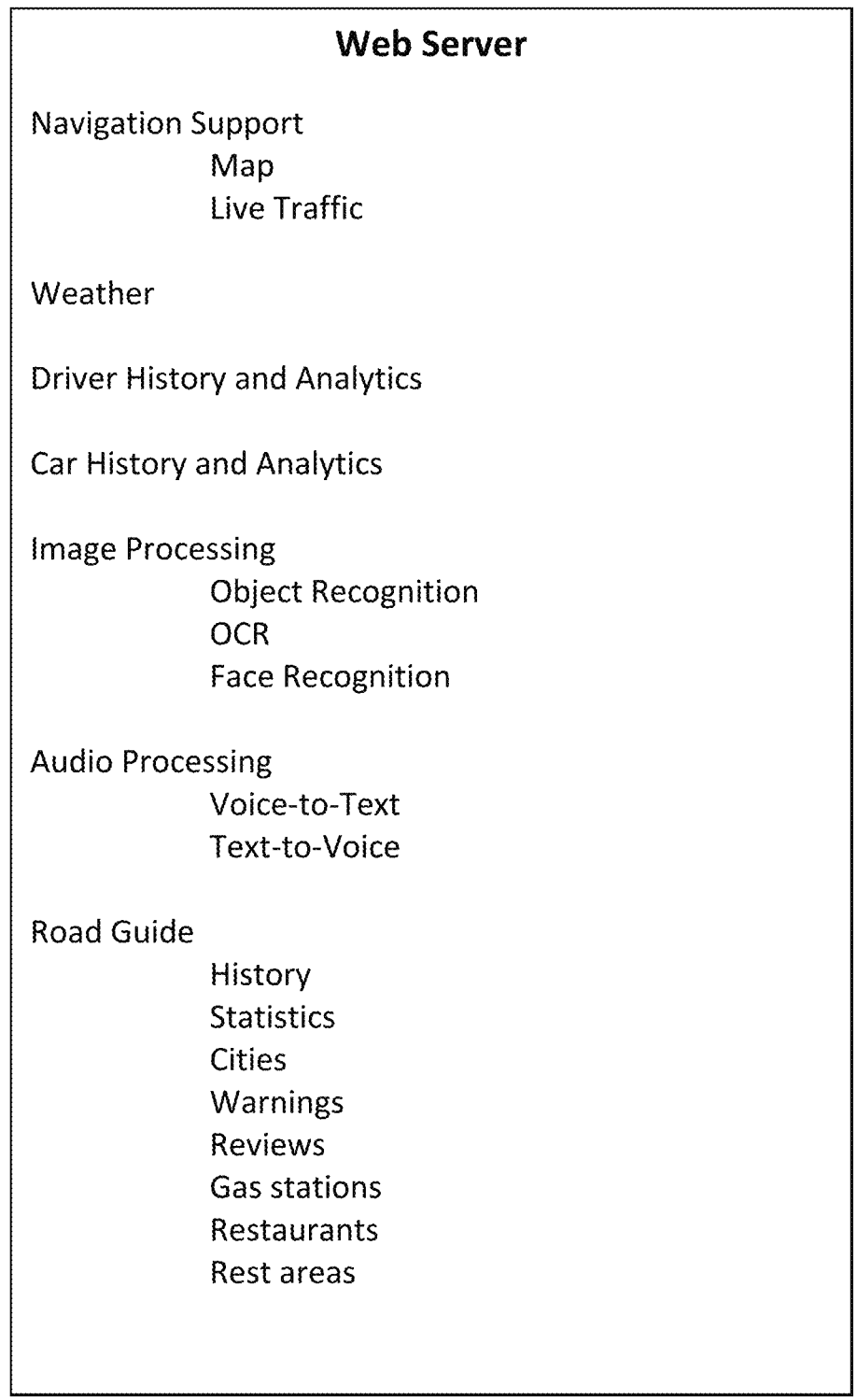
FIG. 27 illustrates the role of the web server as a part of the driver assistant apparatus.
Figure 28:
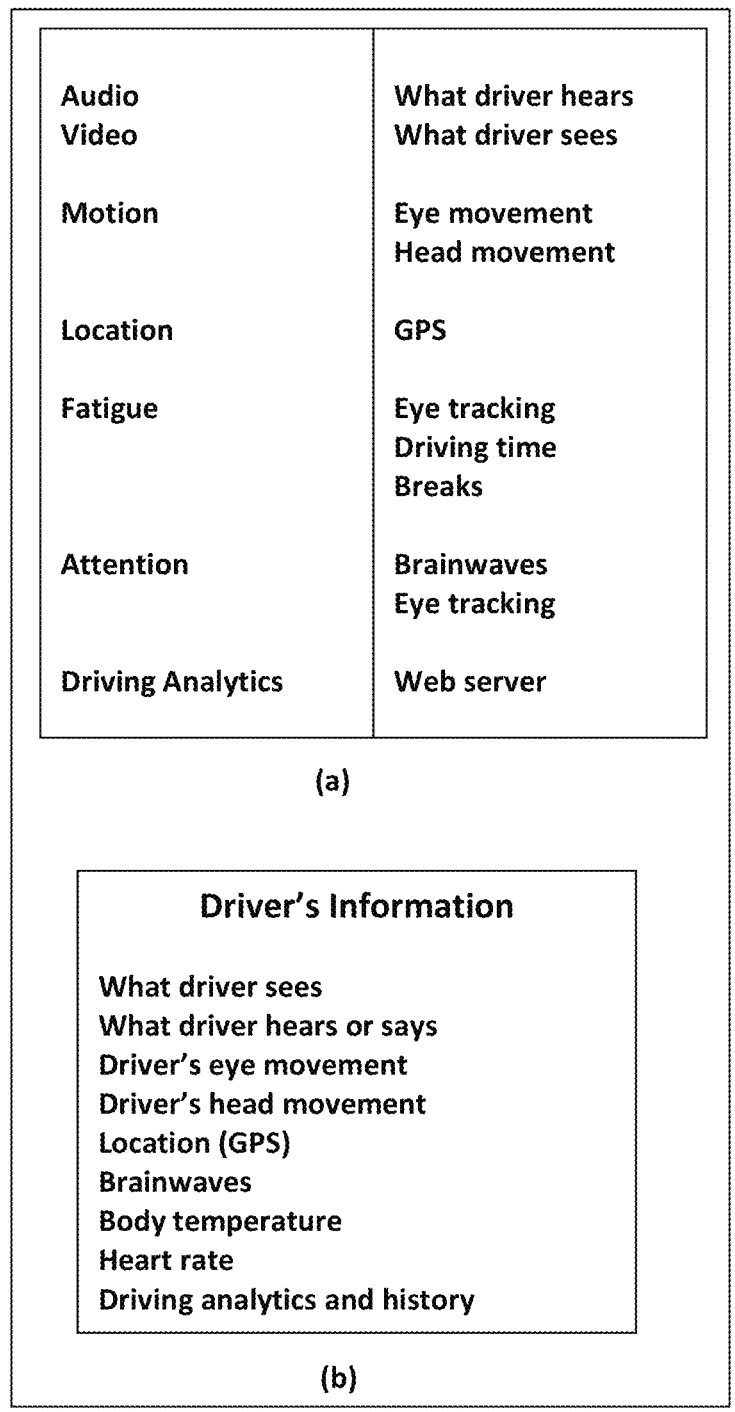
FIG. 28 lists means to extract information about the driver.
Figure 29:
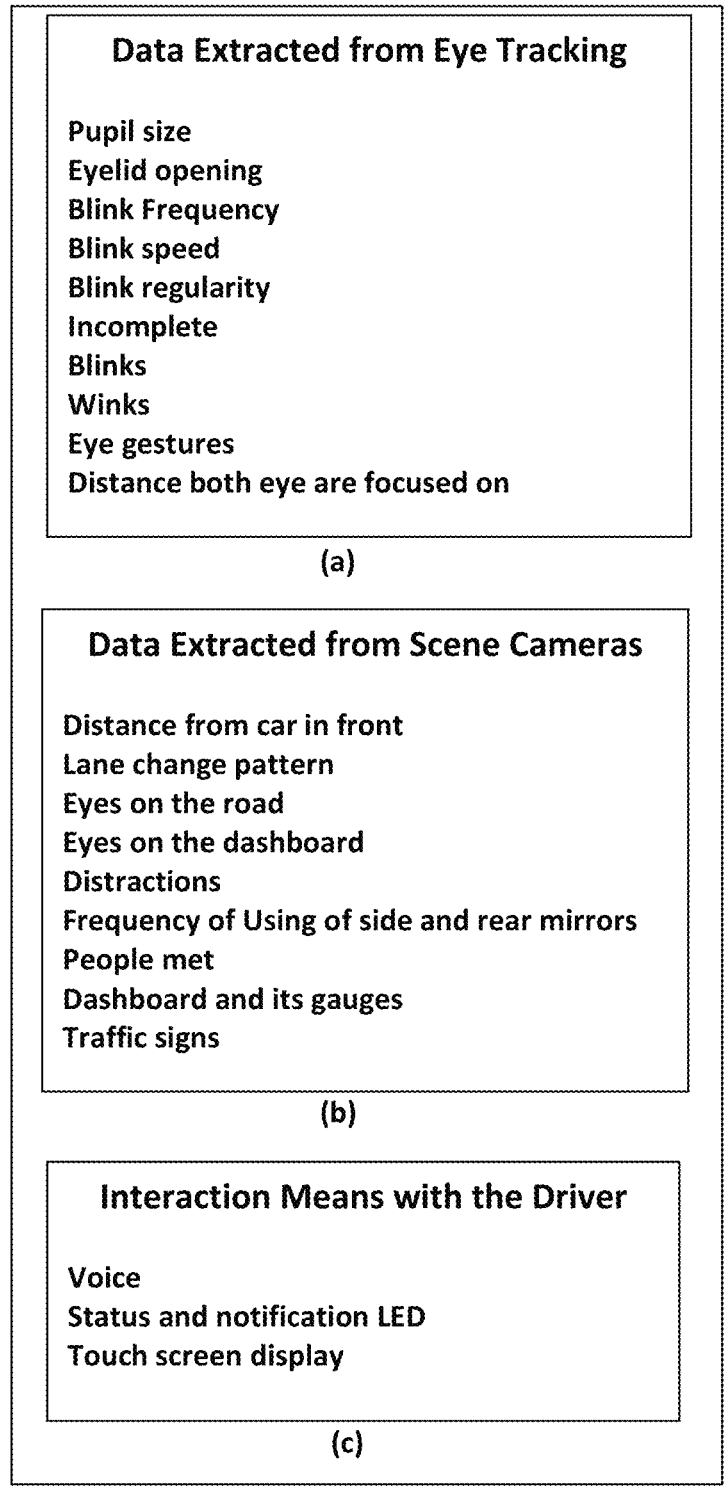
FIG. 29 lists the extracted information from the eye tracking and scene tracking cameras of a wearable computer used for driver assistance and means for communication between the driver and the wearable computer.

The driver assistance is a combination of hardware and software solution. The hardware is a Smartcamera with an eyewear and a control module. A driver assistance software program or app runs on the microcontroller. The app monitors the car via communication with the vehicle's diagnostics server; it monitors the driver via the many sensors that a Smartcamera has. The app is in communication with a web server to store the collected data, access various online databases such as map and road condition, and utilize cloud-based processing for CPU intensive tasks. The web server also gathers, stores, and analyzes the collected data about the driver and the car. A list of services that the web server can provide is shown in FIG. 27. The app interacts with the driver mainly via voice and has access to the information gathered by a Smartcamera and shown in FIG. 28a and data about the driver in FIG. 28b. The app extracts the information shown in FIG. 29a from the eye tracking data. Information extracted from scene cameras are shown in FIG. 29b. The app interacts with the driver via means listed in FIG. 29c. Voice is the main communication tool between the driver and the app.

The eyewear version of the Smartcamera disclosed in this invention is a wearable computer embedded in an eyeglass frame. It uses gaze aware scene cameras to see what the driver is looking at while having access to his whole view. It has a microphone and a speaker disposed in the eyewear allowing voice interaction between the driver and an app running on the processor. It has status LEDs to provide feedback and notifications to the driver visually. The processor or microcontroller is similar to those used in smartphones and can run software programs and apps. The eye tracking cameras monitor both eyes of the driver and from the taken eye images, the processor can estimate a number of parameters that can be used to judge the driver's awareness level. These parameters are well known and have been documented in the literature. These parameters include, for example, blinking frequency, blink duration, eyelid speed during blinking, eyelid opening and its variation over time. Partial blinking is a sign of fatigue; it occurs irregularly and has not been reported in the eye tracking literature focused on drivers. Ignoring it can lead to errors in some of the measured parameters that are used to determine a driver's fatigue level. Partial blinking can be measured using an eye tracker that measures eyelid opening during blinks.

Proper illumination of the eye surface with infra-red light can result in much simplified and more power efficient algorithms for estimating eye parameters. For example, the fiber optic illumination technique described in this disclosure makes measurement of eyelid opening and eyelid speed very simple by reducing the standard image processing technique to signal processing.

In addition to the information about the eye movement, Smartcamera monitors a drivers head movements and physical location. The motion sensors are capable of also counting steps, as it is done in activity trackers such as Fitbit devices. Using data from a GPS and a timer, the processor can measure the car's speed and the duration of driving. Monitoring a driver's brainwaves is another key parameter that can be used to judge the driver's awareness level.

The driver assistance app running on the microcontroller can use object recognition, optical character recognition (OCR) and face recognition to make sense of what the driver can see within his whole view, and what he is paying attention to within his binocular view. With this information, the app can determine if the driver is distracted during driving. For example, with object recognition it is easy to detect if a driver is playing with his phone or is texting while the car is on the road. With OCR, the app can read the road signs. Access to a map and GPS allows the processor to perform the standard navigation services but it's the OCR and object recognition that can confirm if a driver is alert and is respecting the traffic signs. The image processing tasks for OCR and object recognition may occur on a web-server when needed.

Keeping a safe distance from the car in front can be determined by calculating the car's speed and its distance from the car in front. The car's speed can be measured using GPS, or read off the speedometer, or be obtained from the car's diagnostics server. Distance measurement can be done using images from the two scene cameras and a given gaze point or a single feature on the back of the car. Look up tables are used to judge if the driver is not keeping a safe distance. Similarly, proper lane change or use of mirrors can be monitored. By comparing these measurements against the driver's historical data, determination may be made about the driver's alertness. The historical data can also be used to provide feedback to the driver so he can improve his driving skills.

The driver assistance app can also see and read the gas level in the tank using object recognition and OCR or from the car's diagnostic server. Having access to a navigation server or database allows the app to find out the location of upcoming gas stations and their prices, and finally make a recommendation to the driver on where to refuel the tank. Clearly such a driver assistant is anticipating the driver's needs and proactively takes actions to address them.

Over time, the app can store the driver's behavior and learn from it to establish a base line and use it to evaluate a driver's alertness and performance. By keeping a history, the app will also know if this is the first time that a driver is on a new road. If so, the app can obtain information from the web server about the road, daily accidents, cities on the route and others facts of interests and share them with the driver via voice. These are examples of useful data that no driver can easily gather on his own but every driver can benefit from it.

Not all accidents are due to drivers being drowsy; many times the road has a poor condition or was poorly designed. If the app informs a driver that a certain upcoming road segment is a high accident zone, the driver will be extra cautious. Such up-to-date information can easily be gathered and shared by an app while the driver can focus on driving.

Regular prescription lenses can be installed on a Smartcamera eyewear. The installed lenses can also regulate the amount of the light that reaches the eyes passively or actively and hence, eliminating the need for an extra pair of sunglasses. Electronic tunable lenses can also be installed on the eyewear to offer on demand optical power to compensate for vision deficiencies.

In one implementation, the control module can be a smartphone and the digital personal assistant residing on the phone can be the interface between the driver and the driver assistance app. Siri, Google Now and Cortana are three good candidates.

ADDRESSING PRIVACY FOR WEARABLE CAMERAS

With the introduction of wearable cameras and smart glasses such as Google Glass, people are concerned about the intrusion of their privacy because such wearable devices can take pictures or record video without drawing attention. Even though in public places there is no expectation of privacy, people still like to know if they are being recorded and when possible let others know if they do not want to be recorded. While having an illuminated red LED on the wearable camera is useful, it may not be readily noticed by others. To address this need, a wireless solution is presented via a mobile application called App-1 in this disclosure.

Each smart device needs to install App-1 or integrate it into other mobile apps in order to utilize it. App-1 is managed from a web-server. Each device receives a unique identification name upon registration. As soon as a recording app on the smart device starts recording, App-1 uses an available and predetermined wireless means, for example Bluetooth, to inform other devices in its vicinity about the ongoing recording. The announcement can also be made or confirmed via the server. Upon receiving the announcement by a smart device, the user of the device is informed via a lighted or flashing red LED, vibration of the device or an audio signal. If a red LED is available on the wearable camera, App-1 will turn it on if possible.

The wireless announcement can be made over Bluetooth or WIFI, or any other commonly available wireless protocol. The announcement can occur via an existing announcement method allowed by the wireless protocol. All wireless devices are capable of announcing their network names, Service Set Identifier or SSID, or sending a request for pairing to another device. A simple implementation is to announce a unique network name reserved for this application. For example, a unique name is Wred LED followed by an identifier. Any smart device that detects such a network name can conclude a recording is in progress.

To prevent the abuse, a recording announcement is followed up via a proprietary announcement over the wireless protocol or via the server. A receiving device can start searching for the announcement once it detects a name indicating recording.

The app can also inform the app's web server that it is recording. The server makes the announcement to the relevant devices in the vicinity of the recording device after determining their proximity. Location of smart devices can be measured using at least GPS. The server can also provide a map of various devices with respect to the recording device and provide the map to the devices in the vicinity of the recording device.

Each user can set his preference to receive or ignore such announcements. Users can also set their own recording policy and share it with the server. The server can communicate such preferences to a user of a recording device in a number of ways. For example, prior to recording, a user may consult the server to find out if there is anyone in his vicinity that minds being recorded. The server can also turn on a flashing red LED on the recording device if the user decides to record despite objections of others according to their policies.

For more accuracy, a video recording device may communicate its location and the direction at which the camera is pointed at to the server. With the added information, the server may decide to inform those who are within the field of view of the camera. The server can also use various time of flight techniques to measure the distance between the recording device and any other device in the vicinity.

Wireless routers in a building can also be configured to announce recording policy to the people in the building via their smart devices. For example, bars may not want any wearable camera to video-record their patrons. Such routers can also be in communication with the web server. Ultimately, the web server is a registry place for the policy and preferences of people and places in real time. A movie theater can choose to prohibit any video recording and the server will remind those who forget.

Once an App-1 receives a recording announcement, it stores it securely and can share it with the server to discourage the abuse.

It will be appreciated by those skilled in the art having the benefit of this disclosure that this METHOD AND APPARATUS FOR A WEARABLE COMPUTER provides a new platform for human-machine interface. As a result, such computers can become human helpers through a new generation of digital personal assistants that for the first time will see and hear what a user sees, hears and does. They will be able to anticipate a user's needs and offer help proactively. One disclosed embodiment related to Smart cameras that are hands-free and attention-free. Moreover, they can interact with a user via a natural interface. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:
1. An imaging apparatus comprising:
a frame configured to be worn on the head of a user;
a scene camera module coupled to the frame and configured to capture scene images of a scene viewed by the user;
an eye tracking module disposed on or in the frame and configured to capture eye images of the eyes of the user; and
a motion sensor disposed on or in the frame to capture head movements data representing head movements of the user;
a processor configured to:
receive the scene images from the scene camera module;
recognize an object in the scene images to provide object recognition;
receive the eye images from the eye tracking module;
determine the user is authorized to use the imaging apparatus based at least in part on recognizing the eyes of the user in first ones of the eye images;
estimate eye movements of the eyes of the user based on second ones of the eye images;
maintain an eye movements history of the eye movements over time;
receive the head movements data from the motion sensor;
maintain a head movements history of the head movements over time based on the head movements data; and
perform an operation based on at least a portion of the head movements history, at least a portion of the eye movements history, and the object recognition.

2. The imaging apparatus of claim 1 wherein the perform the operation comprises determining that the user is paying attention to or looking at the object using the object recognition, the at least a portion of the head movements history, and the at least a portion of the eye movements history.

3. The imaging apparatus of claim 2 wherein:
the processor is further configured to generate a visual feedback signal representing a visual feedback indication that the user is paying attention to or looking at the object;
the imaging apparatus further comprises a feedback unit disposed on or in the frame and configured to:
receive the visual feedback signal from the processor; and
display the visual feedback indication to the eyes of the user in response to the visual feedback signal.

4. The imaging apparatus of claim 3 wherein:
the visual feedback indication comprises a specific color of light; and
the feedback unit comprises light emitting diodes that emit the specific color of light.

5. The imaging apparatus of claim 2 wherein the determining that the user is paying attention to or looking at the object comprises determining that the eye movements of the user maintained in the at least a portion of the eye movements history have only a small variation or spread while the head movements of the user maintained in the at least portion of the head movements history remain relatively fixed.

6. The imaging apparatus of claim 5 wherein the eye movements of the user comprise gaze directions of the user.

7. The imaging apparatus of claim 2 wherein the determining that the user is paying attention to or looking at the object comprises generating a motion vector representing the gaze directions of the user by combining the at least portion of the eye movements history and the at least portion of the head movements history.

8. The imaging apparatus of claim 7 wherein:
the head movements maintained in the head movements history comprise linear head accelerations and angular head rotations;
the eye movements maintained in the eye movements history comprise angular eye rotations;
the generating the motion vector comprises:
generating a linear head acceleration vector for the linear head accelerations in the at least portion of the head movements history;
generating an angular head rotation vector for the angular head rotations in the at least portion of the head movements history;
generating an angular eye rotation vector for the angular eye rotations in the at least portion of the eye movements history; and
summing the linear head acceleration vector, the angular head rotation vector, and the angular eye rotation vector to form the motion vector.

9. The imaging apparatus of claim 2 wherein:
the object comprises a hand of the user;
the determining that the user is paying attention to or looking at the object comprises determining that the user is looking at the hand of the user;
and the operation further comprises interpreting a gesture or a movement of the hand of the user in at least some of the scene images.

10. The imaging apparatus of claim 9 wherein:
the processor is further configured to generate a visual feedback signal representing a visual feedback indication that the user is looking at the hand;
the imaging apparatus further comprises a feedback unit disposed on or in the frame and configured to:
receive the visual feedback signal from the processor; and
display the visual feedback indication to the eyes of the user in response to the visual feedback signal.

11. The imaging apparatus of claim 9 wherein:
the processor is further configured to generate a visual feedback signal representing a visual feedback indication that the gesture or the movement of the hand is understood;
the imaging apparatus further comprises a feedback unit disposed on or in the frame and configured to:
receive the visual feedback signal from the processor; and
display the visual feedback indication to the eyes of the user in response to the visual feedback signal.

12. The imaging apparatus of claim 9 wherein the perform the operation further comprises selecting subset portions of at least some of the scene images containing the hand of the user and interpreting the gesture or the movement of the hand of the user in the subset portions of the at least some of the scene images.

13. The imaging apparatus of claim 1 wherein the perform the operation includes anticipating a need of the user with respect to the object using at least a portion of the head movements history and at least a portion of the eye movements history.

14. The imaging apparatus of claim 1 wherein the eye movements history provides a trajectory of the eye movements of the eyes of the user.

15. The imaging apparatus of claim 2 wherein the perform the operation further comprises creating a scene map of the object based on the determining the user is paying attention to or looking at the object.

16. The imaging apparatus of claim 1 wherein the processor comprises:
a first processor configured to:
receive the scene images from the scene camera module;
recognize the object in the scene images to provide the object recognition;
receive the eye images from the eye tracking module;
determine the user is authorized to use the imaging apparatus based at least in part on recognizing the eyes of the user in first ones of the eye images;
estimate eye movements of the eyes of the user based on second ones of the eye images;
maintain the eye movements history of the eye movements over time;
receive the head movements data from the motion sensor; and
maintain the head movements history of the head movements over time based on the head movements data; and
a second processor configured to:
receive the head movements history, the eye movements history, and the object recognition from the first processor;
perform the operation based on the at least a portion of the head movements history, the at least a portion of the eye movements history, and the object recognition.

17. The imaging apparatus of claim 1 wherein
the operation is performed by providing the at least a portion of the head movements history, the at least a portion of the eye movements history, and the object recognition for use by software that performs the operation based thereon.

18. The imaging apparatus of claim 17 wherein the imaging apparatus further comprises the software.

19. The imaging apparatus of claim 1 wherein
the operation is performed by executing software that performs the operation based on the at least a portion of the head movements history, the at least a portion of the eye movements history, and the object recognition.

20. The imaging apparatus of claim 19 wherein the imaging apparatus further comprises the software.

21. The imaging apparatus of claim 1, wherein the scene camera module is disposed on or in the frame.

22. The imaging apparatus of claim 1, wherein the scene camera module is remotely coupled to the frame.

23. The imaging apparatus of claim 1, further comprising electronics elements configured to be disposed on or in the frame, wherein the electronics elements comprise the processor.

24. The imaging apparatus of claim 1, further comprising electronics elements configured to be remotely coupled to the frame, wherein the electronics elements comprise the processor.

25. A method for performing an operation on an object, the method comprising:
providing an imaging apparatus, comprising:
a frame configured to be worn on the head of a user;
a scene camera module coupled to the frame and configured to capture scene images of a scene viewed by the user;
an eye tracking module disposed on or in the frame and configured to capture eye images of the eyes of the user;

a motion sensor disposed on or in the frame to capture head movements data representing head movements of the user; and a processor;

receiving the scene images from the scene camera module;

recognizing the object in the scene images to provide object recognition;

receiving the eye images from the eye tracking module;

determining the user is authorized to use the imaging apparatus based at least in part on recognizing the eyes of the user in first ones of the eye images;

estimating eye movements of the eyes of the user based on second ones of the eye images;

maintaining an eye movements history of the eye movements over time;

receiving the head movements data from the motion sensor;

maintaining a head movements history of the head movements over time based on the head movements data; and performing the operation based on at least a portion of the head movements history, at least a portion of the eye movements history, and the object recognition.

26. The method of claim 25 wherein the performing the operation comprises determining that the user is paying attention to or looking at the object using the object recognition, the at least a portion of the head movements history, and the at least a portion of the eye movements history.

27. The method of claim 26 wherein the determining that the user is paying attention to or looking at the object comprises generating a motion vector representing the gaze directions of the user by combining the at least a portion of the eye movements history and the at least a portion of the head movements history.

28. The method of claim 27, wherein:

the head movements maintained in the head movements history comprise linear head accelerations and angular head rotations;

the eye movements maintained in the eye movements history comprise angular eye rotations; and the generating the motion vector comprises:

generating a linear head acceleration vector for the linear head accelerations in the at least a portion of the head movements history;

generating an angular head rotation vector for the angular head rotations in the at least a portion of the head movements history;

generating an angular eye rotation vector for the angular eye rotations in the at least a portion of the eye movements history; and summing the linear head acceleration vector, the angular head rotation vector, and the angular eye rotation vector to form the motion vector.

* * * * *

UNITED STATES PATENT AND TRADEMARK OFFICE
CERTIFICATE OF CORRECTION

PATENT NO. : 12,125,285 B1
APPLICATION NO. : 17/887439
DATED : October 22, 2024
INVENTOR(S) : Masoud Vaziri It is certified that error appears in the above-identified patent and that said Letters Patent is hereby corrected as shown below:

On the Title Page

At Related US Application Data Item (63), please delete "Continuation of application No. 16/578,285, filed on Sep. 21, 2019, now Pat. No. 11,450,113." and insert --Continuation of application No. 16/578,285, filed on Sep. 21, 2019, now Pat. No. 11,450,113, which is a continuation of application No. 15/859,526, filed on Dec. 31, 2017, now Pat No. 10,423,837, which is a continuation of application No. 15/663,753, filed on Jul. 30, 2017, now Pat No. 10,019,634, which is a continuation of application No. 14/985,398, filed on Dec. 31, 2015, now Pat. No. 9,727,790, which is a continuation-in-part of application No. 13/175,421, filed on Jul. 1, 2011, now abandoned, which is a continuation-in-part of application No. 12/794,283, filed on Jun. 4, 2010, now Pat. No. 8,872,910.-- therefor.

At Related US Application Data Item (60), insert --Provisional application No. 62/205,783, filed on Aug. 17, 2015, provisional application No. 62/128,537, filed on Mar. 5, 2015, provisional application No. 62/099,128, filed on Dec. 31, 2014, provisional application No. 61/471,397, filed on Apr. 4, 2011, provisional application No. 61/471,376, filed on Apr. 4, 2011, provisional application 61/369,618, filed on Jul. 30, 2010, provisional application No. 61/184,232, filed on Jun. 4, 2009.--.

Signed and Sealed this
Seventeenth Day of December, 2024

Derrick Brent
*Acting Director of the United States Patent and Trademark Office*